(12) United States Patent
Wang

(10) Patent No.: US 8,489,726 B2
(45) Date of Patent: Jul. 16, 2013

(54) DISTRIBUTED NETWORK CONSTRUCTION METHOD, SYSTEM AND TASK PROCESSING METHOD

(75) Inventor: Tieying Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 12/980,900

(22) Filed: Dec. 29, 2010

(65) Prior Publication Data

US 2011/0099262 A1 Apr. 28, 2011

Related U.S. Application Data

(63) Continuation of application No. PCT/CN2009/074451, filed on Oct. 14, 2009.

(30) Foreign Application Priority Data

Dec. 19, 2008 (CN) .......................... 2008 1 0240455

(51) Int. Cl.
   *G06F 15/173* (2006.01)

(52) U.S. Cl.
   USPC ........................ 709/223; 709/225; 709/226

(58) Field of Classification Search
   USPC .................................................. 709/223
   See application file for complete search history.

(56) References Cited

U.S. PATENT DOCUMENTS

| | | | | |
|---|---|---|---|---|
| 7,272,645 | B2 * | 9/2007 | Chang et al. | 709/223 |
| 7,304,994 | B2 | 12/2007 | Dubnicki et al. | |
| 7,509,372 | B2 * | 3/2009 | Dutta et al. | 709/203 |
| 2003/0055892 | A1 * | 3/2003 | Huitema et al. | 709/204 |
| 2006/0176842 | A1 | 8/2006 | Tamura et al. | |
| 2007/0239987 | A1 | 10/2007 | Hoole et al. | |
| 2007/0258389 | A1 * | 11/2007 | Suzuki et al. | 370/254 |
| 2009/0103702 | A1 * | 4/2009 | Allen et al. | 379/142.04 |
| 2009/0116484 | A1 * | 5/2009 | Buford | 370/392 |

FOREIGN PATENT DOCUMENTS

| | | |
|---|---|---|
| CN | 1783823 A | 6/2006 |
| CN | 1885795 A | 12/2006 |
| CN | 101146022 A | 3/2008 |
| CN | 101159966 A | 4/2008 |
| WO | 2008101169 A2 | 8/2008 |
| WO | WO2008101169 A2 | 8/2008 |
| WO | WO2010069198 A1 | 6/2010 |

OTHER PUBLICATIONS

Written Opinion of the International Searching Authority from the Chinese Patent Office for International Application No. PCT/CN2009/074451 mailed Jan. 21, 2010.
Partial Translation of First Chinese Office Action of Chinese Application No. 200810240455.5 mailed Mar. 23, 2012.
International Search Report for International Application No. PCT/CN2009/074451, mailed Jan. 21, 2010 Huawei Technologies Co., LTD.

\* cited by examiner

*Primary Examiner* — Jeffrey Nickerson
*Assistant Examiner* — Angela Nguyen
(74) *Attorney, Agent, or Firm* — Conley Rose, P.C.; Grant Rudolph; Nicholas K. Beaulieu

(57) ABSTRACT

A distributed network construction method includes: determining a domain that covers a requesting node according to an address of the requesting node which requests to join a distributed network, where the domain has a domain identifier (ID); generating a peer ID of the requesting node according to the number of peers of the domain; concatenating the domain ID with the peer ID to form the node ID of the requesting node; and sending the node ID to the requesting node, where the requesting node obtains information about a neighboring node according to the obtained node ID to join the distributed network.

11 Claims, 15 Drawing Sheets

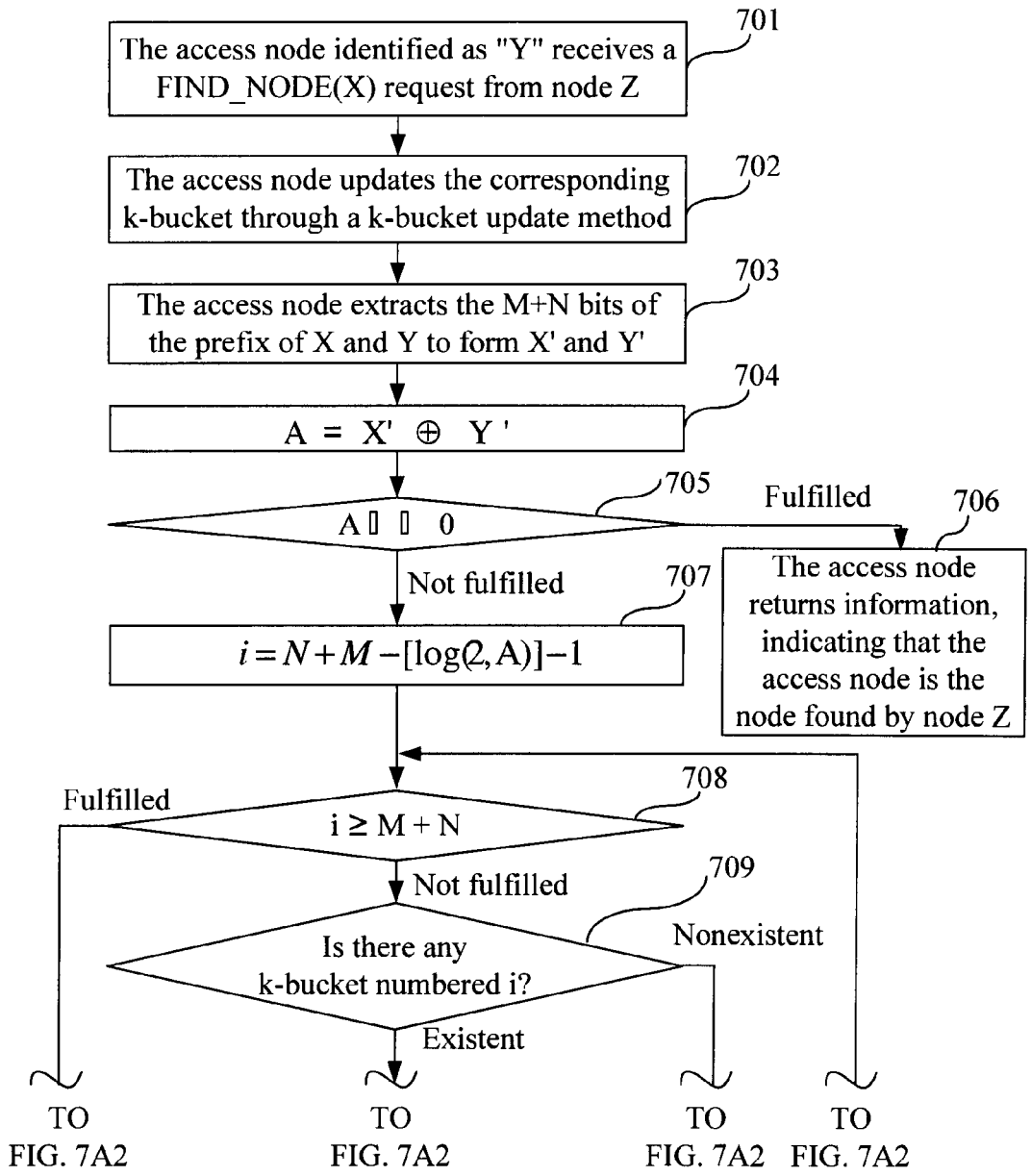
FIG. 7A1

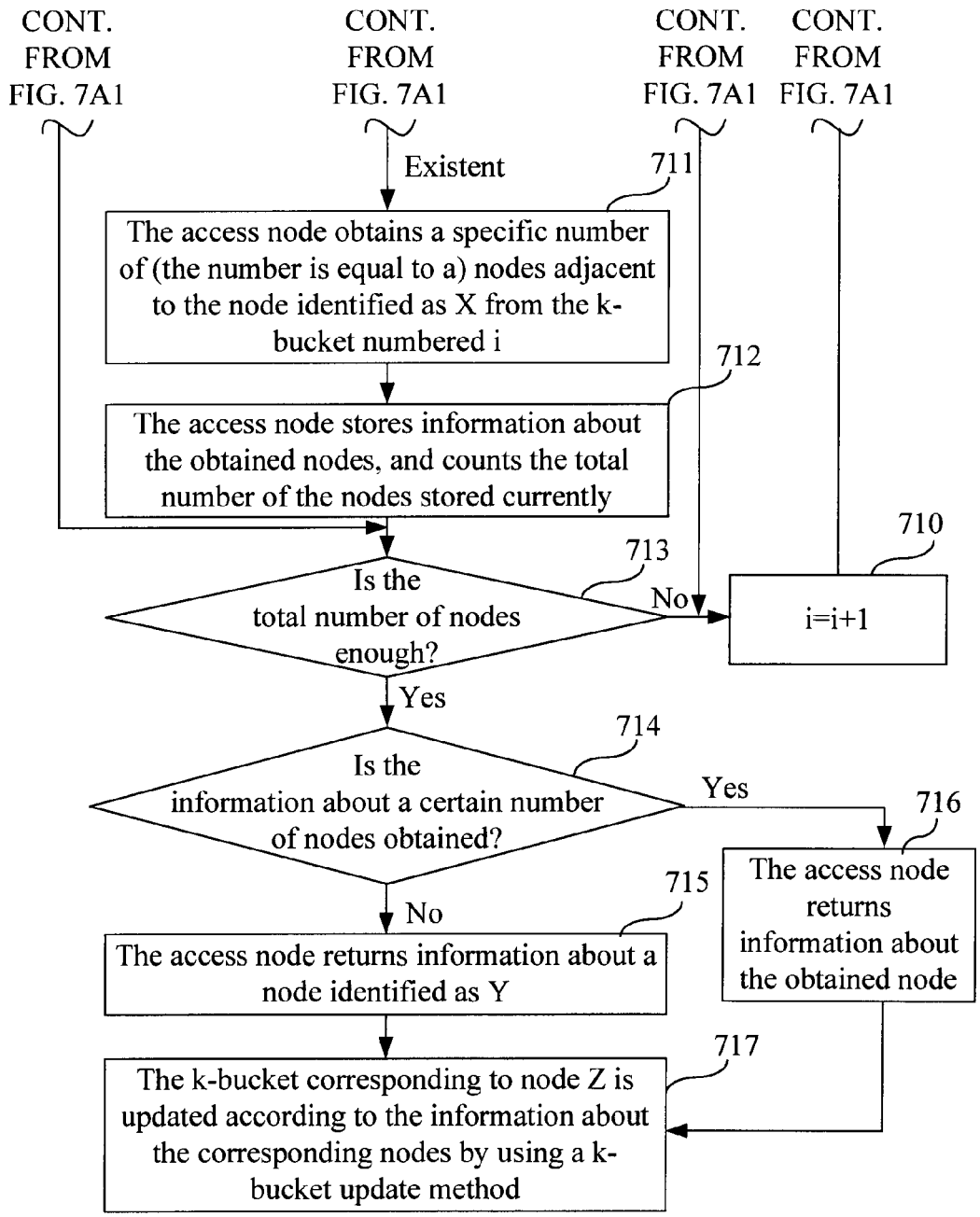
FIG. 7A2

DISTRIBUTED NETWORK CONSTRUCTION METHOD, SYSTEM AND TASK PROCESSING METHOD

CROSS-REFERENCE TO RELATED APPLICATIONS

This application is a continuation of International Application No. PCT/CN2009/074451, filed on Oct. 14, 2009, which claims priority to Chinese Patent Application No. 200810240455.5, filed on Dec. 19, 2008, both of which are hereby incorporated by reference in their entireties.

FIELD OF THE INVENTION

The present invention relates to the field of communications technologies, and in particular, to a distributed network construction method, a distributed network system, and a task processing method.

BACKGROUND OF THE INVENTION

The content delivery network (CDN) has become a main platform for media content delivery. The user generated content (UGC) service networks such as YouTube, YouKu, 56, and Tudou are popularized, and have absorbed plenty of users who share content. Currently, such services are primarily implemented through a distributed network structure where the domains are managed separately. The network structure comes in two modes. One mode is: A domain management server is set in each domain to manage the running conditions of the nodes in the domain, and a central server is set to manage the domain management servers and implement hierarchical management. That is, the shared content in the network is delivered to lower layers through the central server layer by layer so that the content is stored on the node (i.e., an edge server (ES)) in the domain near the user. In this way, the user can obtain the desired content from the ES quickly. The other mode is: The performance of all the nodes in the distributed network is measured, and the nodes of better performance are selected as super nodes. The super nodes manage the nodes in the domain, and no central server is required for managing the super nodes. The second mode simplifies the hierarchical management structure, and is known as a fully distributed network structure.

In the existing fully distributed network structure, the user's requirements for the node that stores content vary geographically, namely, the user can request or store content on the node in the user's own access domain. In such a network structure, two distributed hash table (DHT) algorithms need to be constructed to implement the global content management and the node management of each domain. The DHT algorithms generally applied in the existing distributed network structure include Chord, CAN, Pastry, and kademlia (KAD). The KAD is a topology of a totally new DHT algorithm which uses a special exclusive-or (XOR) algorithm as a distance measurement basis, and improves the speed of querying routes significantly.

In the process of implementing the present invention, the inventor finds at least these defects in the prior art: The node distribution based on the node ID calculated through the existing DHT algorithm is rather uneven, which tends to cause load imbalance on the node. Meanwhile, each node needs to maintain table entries of two structured networks, and the information maintained by certain nodes is redundant and leads to unnecessary overheads.

SUMMARY OF THE INVENTION

The embodiments of the present invention provide a distributed network construction method, a distributed network system, and a task processing method to implement a fully distributed non-cross network structure where the nodes are distributed more evenly.

A distributed network construction method provided in an embodiment of the present invention includes:

determining, according to an address of a requesting node which requests to join a distributed network, a domain that covers the requesting node, and obtaining a domain identifier (ID);

generating a peer ID of the requesting node according to the number of peers of the domain;

concatenating the domain ID with the peer ID to form a node ID of the requesting node; and sending the node ID to the requesting node, where the requesting node obtains information about a neighboring node according to the obtained node ID to join the distributed network.

A task processing method provided in a distributed network constructed through the foregoing distributed network construction method according to an embodiment of the present invention includes:

receiving, by a first node, a task processing request such as a request for uploading, adding or deleting content;

judging whether resource performance of the first node meets task processing requirements;

if resource performance of the first node meets task processing requirements, returning node information of the first node to a second node that sends the task processing request, where the second node initiates operations to the first node; and if resource performance of the first node does not meet task processing requirements, selecting a third node whose resource performance meets the task processing requirements in node lists of the first node, where the selection begins with a node list which stores peer information of a domain of the first node; and returning node information of the third node to the second node that sends the task processing request, where the second node initiates operations to the third node.

A node ID generation apparatus provided in an embodiment of the present invention includes:

a domain ID obtaining module, adapted to determine, according to an address of a requesting node which requests to join a distributed network, a domain that covers the requesting node, and obtain a domain ID;

a peer ID generating module, adapted to generate a peer ID of the requesting node according to the number of peers of the domain; and a node ID obtaining module, adapted to concatenate the domain ID with the peer ID to form a node ID of the requesting node.

A distributed network system provided in an embodiment of the present invention includes:

a request routing server (RRS), adapted to: determine, according to an address of the requesting node which requests to join a distributed network, a domain that covers a requesting node, and obtain a domain ID; generate a peer ID of the requesting node according to the number of peers of the domain; and concatenate the domain ID with the peer ID to form a node ID of the requesting node;

an ES, adapted to: calculate a node ID of the ES according to the domain ID obtained from the RRS, or obtain the node ID of the ES from the RRS, where the node ID of the ES is calculated out by the RRS; store content corresponding to a content ID; search for content index information corresponding to the content registered on one or more ESs whose node ID is closest to the content ID, and search for an ES which stores the content index information desired by this ES; maintain a node list, initiate node query to neighboring ESs, and measure and record their performance; and a content index server (CIS), adapted to: add, delete and deliver the content uploaded to the distributed network system, register the content ID corresponding to the content, receive a content query request sent by a user or the ES, process the content being queried, and return the content ID corresponding to the content being queried.

A storage medium is provided in an embodiment of the present invention. The computer program stored in the storage medium includes at least one code segment for processing signals, and the code segment is executed by a machine so that the machine performs the following steps:

determining, according to an address of a requesting node which requests to join a distributed network, a domain that covers the requesting node, and obtaining a domain ID;

generating a peer ID of the requesting node according to the number of peers of the domain;

concatenating the domain ID with the peer ID to form a node ID of the requesting node; and sending the node ID to the requesting node, where the requesting node obtains information about a neighboring node according to the obtained node ID to join the distributed network.

As seen from the foregoing technical solution that, through the distributed network construction method, the apparatus, the system, and the task processing method under the present invention, the domain that covers the requesting node is determined first, and then the calculated domain ID of the requesting node is concatenated with the peer ID to form the node ID of the requesting node, thus avoiding unbalanced distribution of nodes in the network as a result of using the KAD algorithm to calculate the node ID through a Hash operation directly, balancing the distribution of nodes in the distributed network and the loads on the nodes, and reducing the redundant information maintained by the nodes and the messages exchanged between the nodes.

BRIEF DESCRIPTION OF THE DRAWINGS

FIGS. 7A1 and 7A2 show a procedure for processing a FIND_NODE(X) request received by an access node identified as Y according to an embodiment of the present invention;

DETAILED DESCRIPTION OF THE EMBODIMENTS

Figure 1:
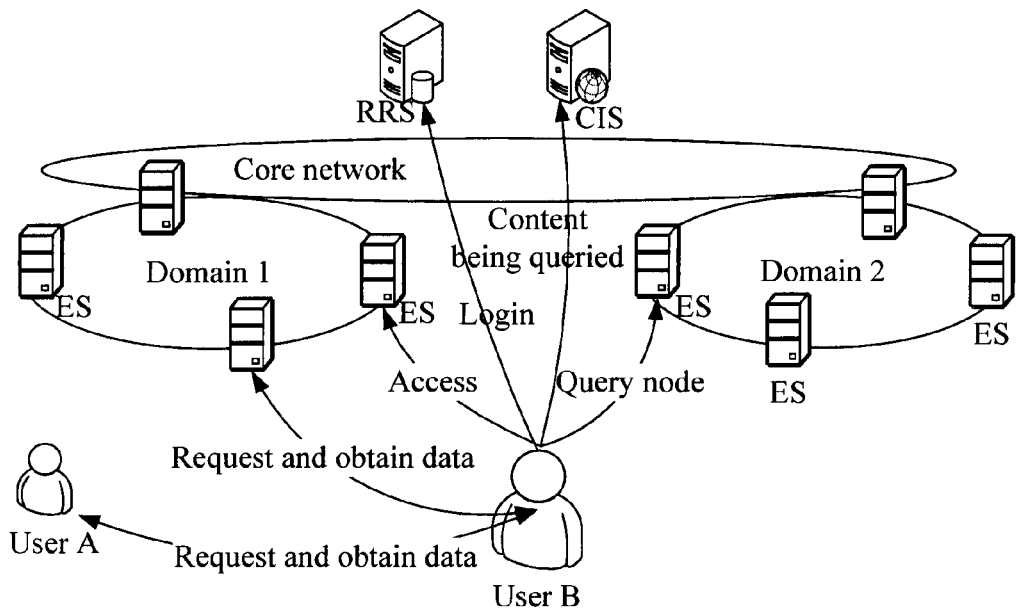
FIG. 1 shows a distributed network scenario according to an embodiment of the present invention.

The following detailed description is given with reference to the accompanying drawings to provide a thorough understanding of the present invention. Evidently, the described embodiments are only a part of, rather than all, embodiments of the present invention, and the embodiments are illustrative in nature and not exhaustive. All other embodiments, which can be derived by those skilled in the art from the embodiments given herein without any creative effort, shall fall within the scope of the present invention.

In the existing fully distributed network, each domain serves as a structured network. The nodes are deployed in a distributed network structure, and the domains are connected up to form a global distributed network structure. The distributed structures of nodes in each domain are interconnected through the global distributed network. In this way, each node needs to maintain table entries of two structured networks (namely, a domain network and a global network). To enable communications between nodes in different domains, it is necessary to set up two DHT algorithms. Through a common intermediate node, the nodes between the domain networks are managed in an intermixed way, and messages are exchanged inside and outside the networks.

In a KAD network set up according to a KAD algorithm, every distributed node calculated out is treated as a leaf of a binary tree, and the location of each node is uniquely determined by the shortest prefix of the node ID calculated out through the KAD algorithm. In the KAD algorithm, the node ID is generally calculated through a Hash function, with a view to distributing the nodes in the distributed network evenly based on the node ID. In this node distribution mode, if the number of nodes is large enough, the distribution of nodes tends to be balanced. In this KAD algorithm, the length of the node ID is generally 160 bits, and is the same as the length of the content ID. In the case of querying content, the node ID is compared with the content ID to find the desired content.

In the process of forming the distributed network, regardless of KAD algorithms or other DHT algorithms, the 128-bit or 160-bit Hash algorithm is applied to calculate the node ID so that the network nodes tend to be distributed evenly in theory. However, when the number of nodes is not large enough, the node distribution is rather uneven if such algorithms are applied to calculate the node ID, and the loads on the nodes are unbalanced. To manage the domains separately in the existing distributed network, the distribution of domains and the global distribution are based on different DHT algorithms. In this case, when a node in one domain interacts with the node in another domain, intermediate nodes are required to serve as hops to other domains. This may result in a single-point effect. Moreover, the nodes in each domain need to maintain the messages exchanged with the intermediate nodes, which increases the overhead of the nodes. Meanwhile, because each node needs to maintain table entries of two structured networks, the information maintained by some nodes is redundant, and leads to an unnecessary overhead. Generally, in the KAD algorithm, every node represented by a 160-bit node ID needs to reserve 160 node lists. If every node list includes node information and heartbeat messages need to be sent periodically between each node and its neighboring node to maintain the message interaction, at least 320 heartbeat messages need to be transmitted between the nodes in each period.

FIG. 1 shows a distributed network scenario according to an embodiment of the present invention. The network devices in the distributed network scenario are shown in FIG. 1. The RRS is adapted to: assign domains, for example, set the address segments of the address of the ES that wants to join the distributed network, and set the domain of the ES; process login requests from the ES and the user node; and locate the domain of the ES and the user node according to the identifier such as the address of the ES and user node. The RRS records the distribution of domains, ESs, and user nodes in the distributed network. At the time of adding a new domain to the network, it is necessary to set the conditions for assigning the new domain and calculate the domain ID of this domain. Meanwhile, at the time of adding each ES or user node, the node ID may be calculated through the ES. The CIS is responsible for centralized content index management, fuzzy search based on keywords of the user, and content management in the distributed network, for example, judging legality of the content, and initiating deletion of illegal content. If content needs to be added in batches, the content may be imported into the CIS first, and then delivered to the ES in the domain that requires the content. The ES stores and delivers content.

In this embodiment, each ES and each user node may be regarded as a node. The word "node" below generally refers to an ES.

Figure 2:
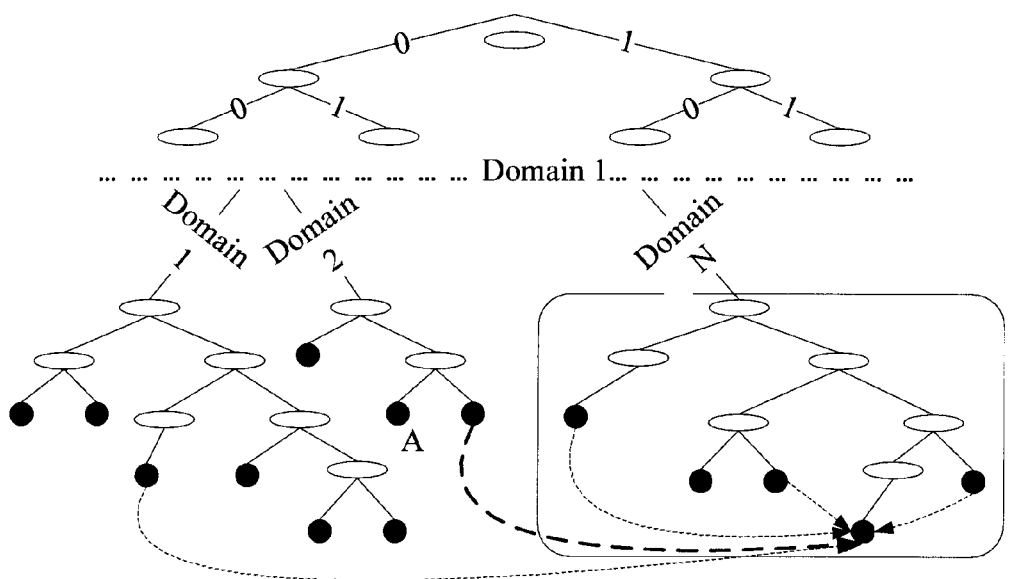
FIG. 2 shows a structured distributed network according to an embodiment of the present invention.

FIG. 2 shows a structured distributed network according to an embodiment of the present invention. FIG. 2 illustrates how to implement balanced distribution of the nodes in the distributed network vividly by applying the structure of the KAD-based structured distributed network shown in FIG. 2 to the distributed network scenario shown in FIG. 1. This embodiment deals with the method for constructing the structured distributed network shown in FIG. 2, node joining, node withdrawal, and query of nodes and content in the distributed network.

In the binary tree structure shown in FIG. 2, each black leaf node represents an ES in the distributed network shown in FIG. 1; other leaf nodes are virtual nodes designed for clearer description, and do not exist physically in the distributed network. In this binary tree structure, the location of the binary tree that includes each leaf node may be represented by 0s and 1s. The string composed of 0s and 1s serves as a prefix of the node ID of the leaf node (ES). Generally, the length of the node ID is the same as the length of the content ID of the ES. If the length of the content ID is 160 bits but the prefix of the node ID of the ES is shorter than 160 bits, the suffix of the node ID may be filled with 0s so that the length is enough.

In one embodiment, two layers of the binary tree are constructed separately. The upper layer is a F layers binary tree structure and indicates the domain that covers the node. The F-bit prefix of the node is a domain ID of the domain that covers the node. A domain ID of the domain that covers a node is concatenated with a peer ID of the domain to form a node ID of the node. Generally, the length of the node ID is the same as the length of the content ID. In this embodiment, if the length of the node ID is 160 bits, if the number of bits of the domain ID is FL, and if the number of bits of the peer ID is PL, the sum of FL and PL is less than or equal to 160. Moreover, the FL and the PL should be great enough to fulfill the scalability of the domains and nodes of the distributed network system. The following expounds how to determine the node ID of the node that wants to join the distributed network, how the node joins or withdraws from the distributed network, and how to search for or store the content in the distributed network.

Figure 3:
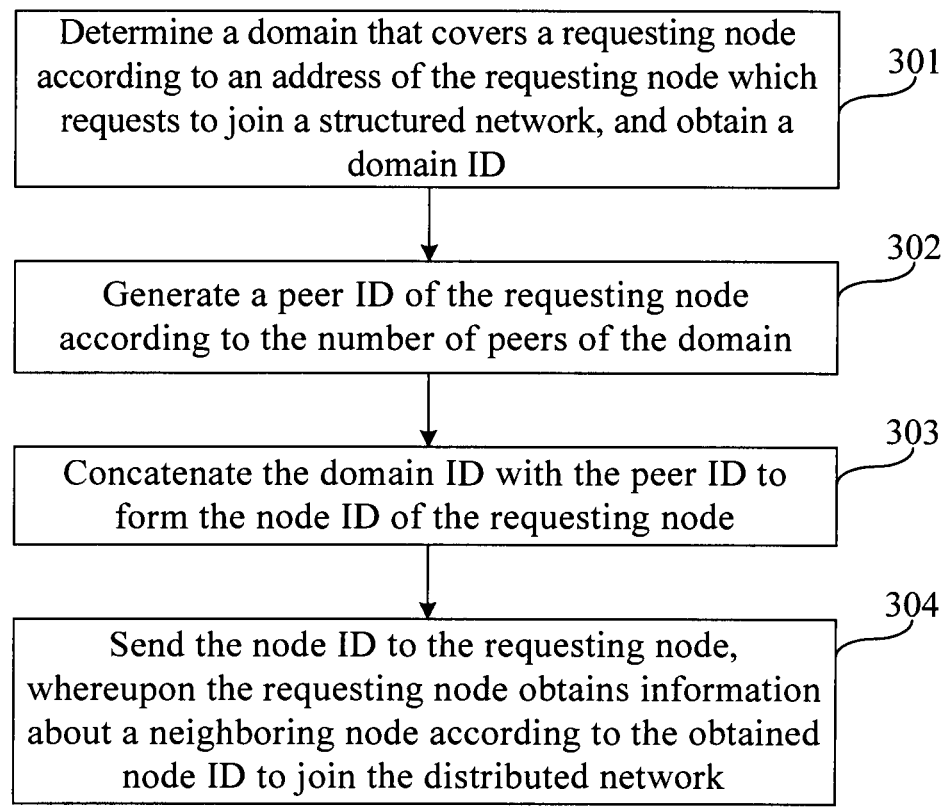
FIG. 3 is a flowchart of a distributed network construction method according to a first embodiment of the present invention.

FIG. 3 is a flowchart of a distributed network construction method according to the first embodiment of the present invention. As shown in FIG. 3, when an ES requests to join a structured distributed network shown in FIG. 2, the processing procedure is as follows:

Step 301: Determine a domain that covers a requesting node according to an address of the requesting node which requests to join the distributed network, and obtain a domain ID.

Step 302: Generate a peer ID of the requesting node according to the number of peers of the domain.

Step 303: Concatenate the domain ID with the peer ID to form a node ID of the requesting node.

Step 304: Send the node ID to the requesting node, where the requesting node obtains information about a neighboring node according to the obtained node ID to join the distributed network.

The step of obtaining the node ID and the step of adding the requesting node to the distributed network according to the node ID may be implemented in the RRS in the scenario shown in FIG. 1, or implemented by another network device capable of obtaining the node ID. Taking the RRS in the scenario shown in FIG. 1 as an example, the domain assignment is recorded on the RRS. The domain assignment indicates the domain that covers the nodes corresponding to specific IP addresses. Therefore, the RRS may determine the domain that covers the requesting node according to the IP address of the requesting node in step 301. For example, the requesting node A in FIG. 2 wants to join domain 2, and the RRS distributes the domains evenly according to the domain ID when domain 2 joins the distributed network previously. In step 302, after it is determined that the requesting node A is in domain 2, the peer ID of the requesting node A can be generated through a preset algorithm according to the number of nodes distributed in domain 2 ("2" in FIG. 2). For example, the domain ID of domain 2 is 0100, and the peer ID of the requesting node A in domain 2 is 1000. Therefore, in step 303, the domain ID is concatenated with the peer ID to form the node ID (01001000) of the requesting node. In step 304, the location of the leaf node to be joined by the requesting node A can be found in the structured binary tree structure of the distributed network shown in FIG. 2 according to the node ID of the requesting node A (the node ID is represented by 0s and 1s), and then the requesting node A obtains information about the neighboring node according to the obtained node ID. In this way, the requesting node can join the distributed network.

Through the distributed network construction method in this embodiment, the domain that covers the requesting node is determined first, and then the calculated domain ID of the requesting node is concatenated with the peer ID to form the node ID of the requesting node, thus avoiding unbalanced distribution of nodes in the network as a result of using the KAD algorithm to calculate the node ID through a Hash operation directly, balancing the distribution of nodes in the distributed network and the loads on the nodes, and reducing the redundant information maintained by the nodes and the messages exchanged between the nodes.

Figure 4:
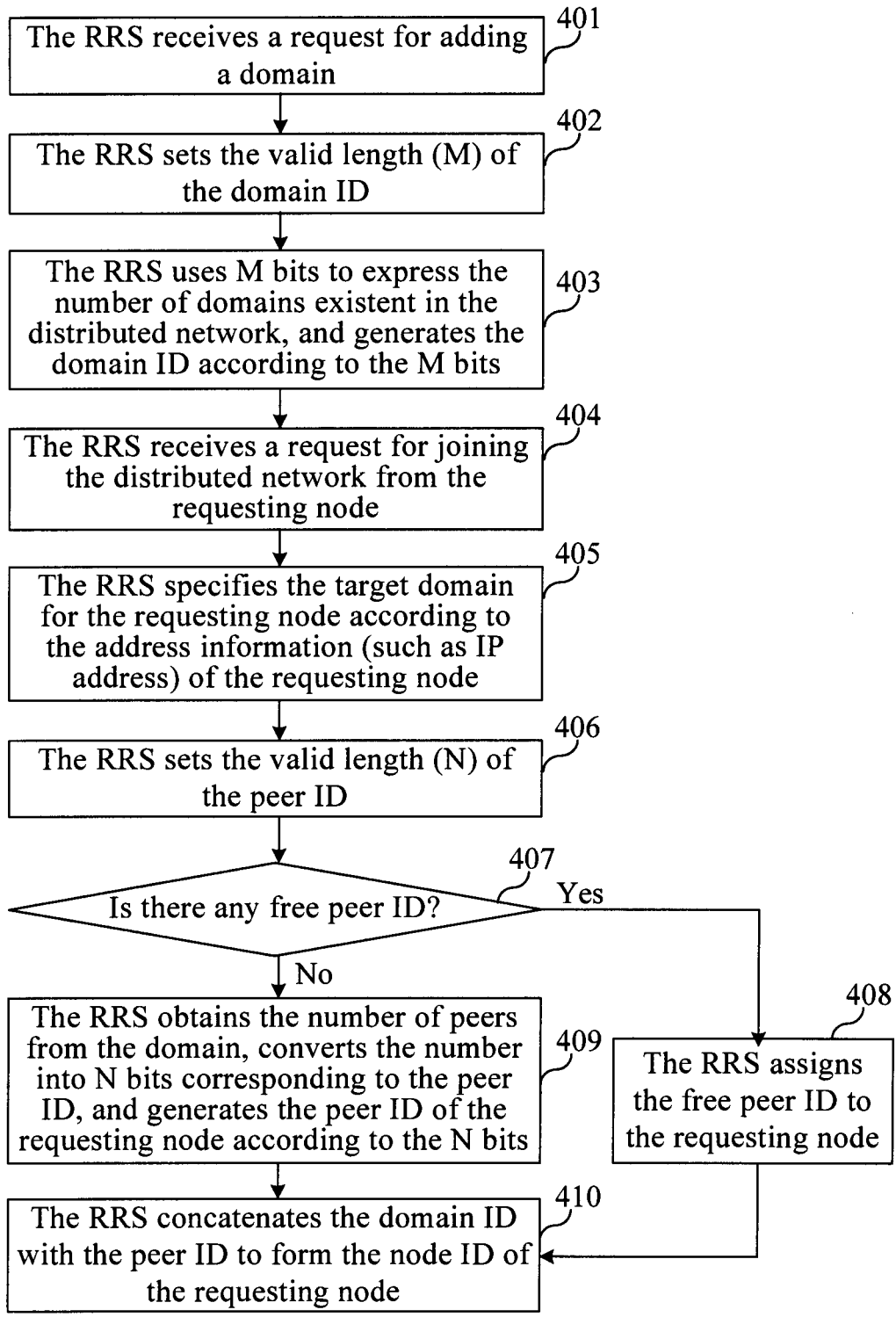
FIG. 4 is a flowchart of a distributed network construction method according to a second embodiment of the present invention.

FIG. 4 is a flowchart of a distributed network construction method according to the second embodiment of the present invention. As shown in FIG. 4, before the requesting node requests to join the distributed network, the RRS in the distributed network needs to assign the domains. In order for the distributed network to expand the assigned domain, the RRS presets the number of bits of the domain ID, and calculates the domain ID of the domain according to the domain ID generation method in this embodiment, with a view to balancing the distribution of the domains. The steps of obtaining the domain ID include:

Step 401: The RRS receives a request for adding a domain.

Step 402: The RRS sets the valid length (M) of the domain ID.

M is a positive integer, and may be set properly to facilitate the expansion of the domain.

Step 403: The RRS converts the number of domains existent in the distributed network into an M-bit value, and generates the domain ID according to the M-bit value.

In this case, the domain which requests to join the distributed network is assigned to a leaf node of a binary tree structure according to the domain ID. The domains in the distributed network can be distributed evenly. When a requesting node requests to join the distributed network, the processing procedure is as follows:

Step 404: The RRS receives a request for joining the distributed network from the requesting node.

Step 405: The RRS assigns a domain to the requesting node according to the address information (such as an IP address) of the requesting node. If the IP address of the requesting node does not fall within the assigned domain of the structured network, the RRS returns a joining failure message to the requesting node and the procedure ends; if the IP address of the requesting node falls within the assigned domain of the structured network, the procedure proceeds to step 406.

Step 406: The RRS sets the valid length (N) of the peer ID.

N is a positive integer, and should be set properly to facilitate the expansion of nodes in the domain.

Step 407: The RRS judges whether a free peer ID exists; if a free peer ID exists, the procedure proceeds to step 408; if no free peer ID exists, the procedure proceeds to step 409.

Step 408: The RRS assigns the free peer ID to the requesting node, and then goes on to step 410.

Step 409: The RRS obtains the number of peers in the domain, converts the number into N-bit value corresponding to the peer ID, and generates a peer ID of the requesting node according to the N-bit value.

Step 410: The RRS concatenates the domain ID with the peer ID to form the node ID of the requesting node.

The RRS sends the obtained node ID to the requesting node, and then the requesting node can obtain the information about the neighboring node according to the node ID, with a view to joining the distributed network.

The calculation steps involved in the joining of a domain and the joining of a node are described in more detail below.

(1) Joining of a Domain

The number of domains may hardly make up a complete binary tree at the first F layers of the distributed network shown in FIG. 2. To balance the loads of the nodes, the distribution of domains also needs to be balanced. Therefore, the domain ID is calculated in step 402 and step 403 so that domains are distributed evenly.

Figure 5:
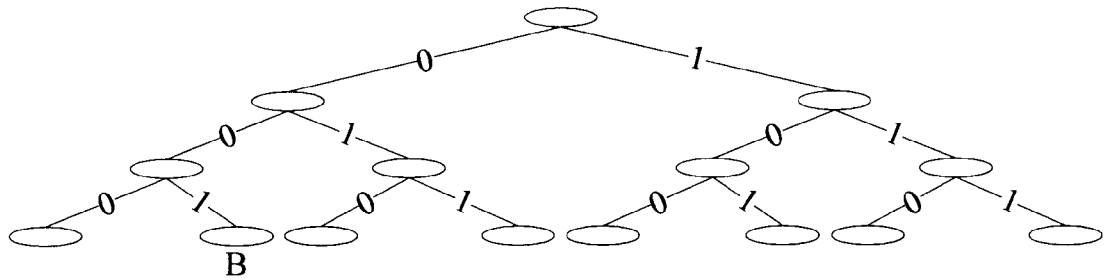
FIG. 5 is a simplified schematic diagram showing the joining of a domain in the distributed network construction method according to the second embodiment of the present invention.

FIG. 5 is a simplified schematic diagram showing the joining of a domain in the distributed network construction method according to the second embodiment of the present invention. As shown in FIG. 5, supposing that the domains are distributed at 3 layers, the valid length of the domain ID is M=3 bits, and the distributed network may be expanded to at most 8 domains. Supposing that the distributed network already has 4 domains, the RRS obtains the number of domains (Domain_Num) currently in the distributed network, and assigns Domain_Num to N, namely, N=4. N is converted to an M-bit value and obtain a string composed of 0s and 1s. The string is FID=100. The FID is inversed to form DomainID=001, namely, node B shown in FIG. 5. Afterward, 1 is added to the Domain_Num for the purpose of calculating the DomainID when a next domain joins the network. If N=0 is obtained in the foregoing step, it is deemed that the domain ID of the new domain is DomainID=000.

FIG. 5 shows a simple 3-layer domain structure. To facilitate the expansion of the domain, the valid length of a domain ID is generally 10 bits, namely, M=10. In this case, distributed network may be expanded to 1024 domains. Therefore, for N=4, the domain ID is FID=0000000100. The domain ID is inversed to form DomainID=0010000000. Therefore, the domain is located at Layer 10 of the distributed network. Generally, the domain ID in the calculated node ID is the first 32 bits of the 160 bits. Supposing that the valid length of the domain ID is 10 bits, 22 bits of the suffix are filled with 0s.

(2) Joining of a Node

When a new node joins the distributed network, the node needs to be identified by a node ID for interactions in the network. When a requesting node joins the network, the node sends a request for joining the distributed network to the RRS. The RRS calculates the domain that covers the requesting node according to the information in the request, and assigns a node ID to the requesting node according to the node information in the domain. Steps 406-409 above are detailed below:

After the requesting node joins a domain, the RRS needs to judge whether the number of free peer IDs (FreePeerID_Num) in the domain is 0. If FreePeerID_Num is not 0, it indicates that a node has ever joined the domain but is currently withdrawn, and the node ID of the withdrawn node has not been assigned to other nodes. Therefore, the RRS assigns the node ID of the withdrawn node to the requesting node directly. If FreePeerID_Num is 0, the RRS obtains the current number of nodes (n=Peer_Num) from this domain, and calculates L which is equal to [log(n)]+1, where [ ] refers to rounding off. The n is converted to a L bits value and form a PID. In this case, if L=0, n is expressed by 0s. The PID is inversed to form a PIID; the PIID is concatenated with PL-L bits to form a peer ID, where the PL-L bits are 0s and PL is the specified valid length of the peer ID in the distributed network. Generally, PL is 128 bits. However, if the number of nodes in a domain does not exceed 1000 in the future expansion, the PL may also be 10 to save resources.

In this case, in step 410, the domain ID is concatenated with the peer ID to form the node ID, which is equal to DomainID||PeerID. Afterward, 1 is added to the number of peers (Peer_Num) to update the current Peer_Num for the purpose of calculating the node ID when the next node joins the distributed network.

When a node joins the distributed network, the calculation of the peer ID is similar to the calculation of the domain ID. The entity for obtaining n=Peer_Num from the domain may be an RRS. After obtaining n=Peer_Num, the RRS calculates the node ID of the requesting node; or, the requesting node obtains the number of peers (n=Peer_Num) and calculates the peer ID, and concatenates the peer ID with the domain ID obtained from the RRS to form the node ID of the requesting node.

Generally, to make the length of the node ID equal to the length of the content ID (for example, 160 bits), the length of the domain ID is 32 bits, and the length of the peer ID is 128 bits. In this case, supposing that the valid length of the domain ID is 10 bits and that the valid length of the peer ID is 10 bits, the remaining bits need to be filled with 0s.

In the method for calculating the domain ID and the peer ID in this embodiment, the valid length is preset. In this way, the valid length of the domain ID and the valid length of the peer ID can be used in the calculation for the operations to be described below: A node joins the distributed network; a node is correlated with another node; a node withdraws from the distributed network; and content is queried and registered.

In the distributed network construction method in this embodiment, the node ID is calculated when a node joins the distributed network. The calculation method is: determine the domain ID of the domain first, determine the peer ID of the requesting node, and then concatenate the domain ID with the peer ID to form the node ID of the requesting node, thus balancing the distribution of nodes in the distributed network and the loads on the nodes. Because the domain distribution and the global distribution do not employ different DHT algorithms, no intermediate node is required, and the single-point effect is avoided. Besides, in the process of calculating the domain ID and peer ID, the valid length of the domain ID and peer ID is specified. For the node corresponding to the previous 160-bit node ID, the node that joins the network needs to maintain at most 160 node lists; but now, if the valid length is 20 bits, the node that joins the network needs to maintain at most 20 node lists, thus reducing the messages forwarded at the time of node query significantly, and reducing the system overhead.

Figure 6:
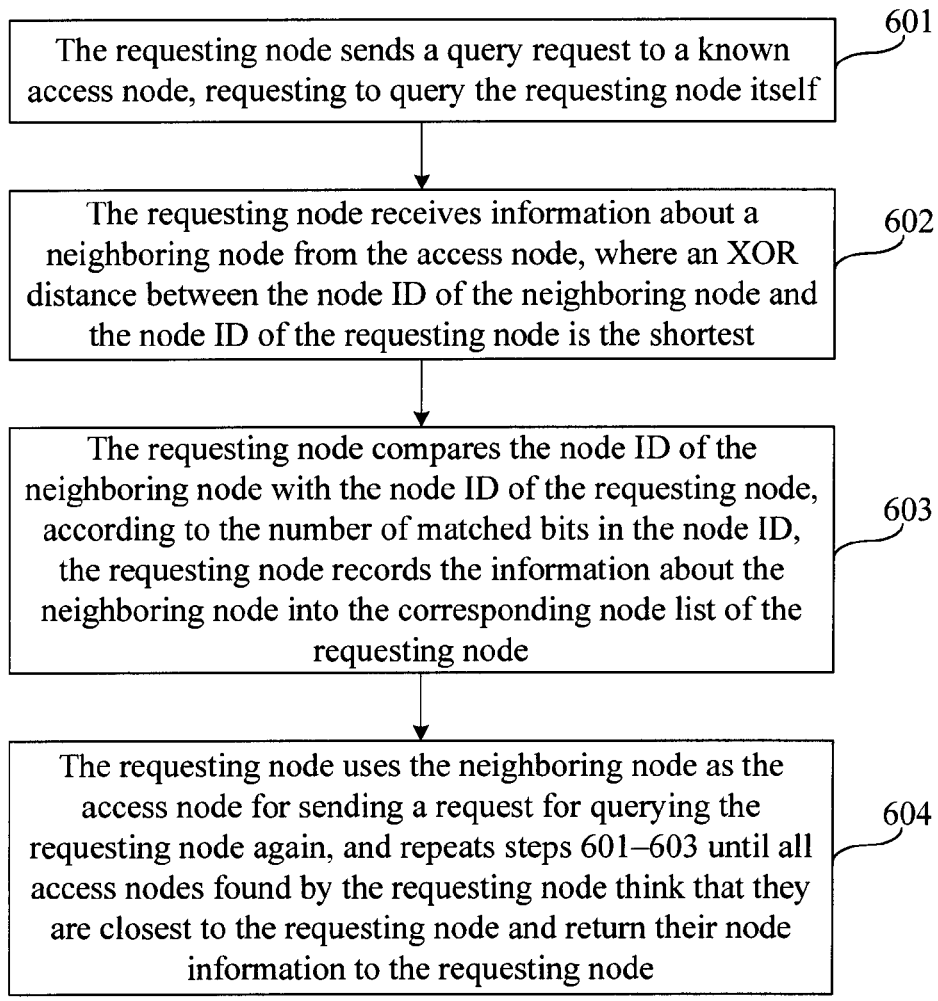
FIG. 6 is a flowchart of a distributed network construction method according to a third embodiment of the present invention.

FIG. 6 is a flowchart of a distributed network construction method according to the third embodiment of the present invention. As shown in FIG. 6, the requesting node obtains the information about the neighboring node according to the node ID. In the process of joining the distributed network, the requesting node needs to obtain a node list by querying another node about the requesting node itself, namely, needs to set up relations with all nodes in the distributed network through node query. After updating all node lists on the requesting node, the requesting node occupies a virtual location (leaf node) in the distributed network shown in FIG. 2, and joins the distributed network shown in FIG. 1. The requesting node obtains the node list through the following steps:

Step 601: The requesting node sends a query request to a known access node, requesting to query the requesting node itself.

In the process of joining the distributed network, the requesting node obtains the information about the access node from the RRS or from the reserved information which has been used by the requesting node. The information about the access node includes the node ID, IP address, and port of the access node, and is written into the corresponding node list of the requesting node. Afterward, the requesting node sends a request for querying the requesting node itself to the access node.

Step 602: The requesting node receives information about a neighboring node from the access node, where the XOR distance between the node ID of the neighboring node and the node ID of the requesting node is the shortest. The information about the neighboring node includes the node ID, IP address and port of the neighboring node.

The access node searches its own node list for the information about the requesting node. If failing to find the information about the requesting node, the access node adds the requesting node to the corresponding node list; and then searches for the neighboring node according to the node ID of the requesting node, where the XOR distance between the node ID of the neighboring node and the node ID of the requesting node is the shortest, and sends the information about the neighboring node to the requesting node.

Step 603: The requesting node compares the node ID of the neighboring node with the node ID of the requesting node. According to the number of matched bits in the node ID, the requesting node records the information about the neighboring node into the corresponding node list of the requesting node.

Step 604: The requesting node uses the neighboring node as the access node for sending a request for querying the requesting node again, and repeats steps 601-603 until all access nodes found by the requesting node think that they are closest to the requesting node and return their node information to the requesting node. The requesting node adds all the received node information about the neighboring nodes to the node list of the requesting node, and the requesting node joins the distributed network.

The node list is also known as a k-bucket in the KAD algorithm. In the distributed network constructed by the KAD algorithm, each node reserves multiple k-buckets. The number of k-buckets depends on the valid length of the node ID. If the valid length of the node ID is 20 bits, there are 20 k-buckets in theory. For any node in a logical binary tree structure which is formed according to the node ID of the node, the binary tree can be decomposed into a series of continuous subtrees, each subtree excluding itself. The subtree at the top layer is composed of the other half of the tree that excludes itself, and the subtree at the lower layer is composed of the other half of the remaining part that excludes itself, and so on, until the whole tree is split. Therefore, the k-bucket numbered i of this node records the information about the node in the subtree as a result of the assignment numbered i+1. Because each k-bucket stores information about at most k nodes, each k-bucket may record the information about all or part of the nodes under the assigned subtree.

In this embodiment, after the requesting node added to the distributed network obtains the node ID, the requesting node refreshes all its node lists (namely, the k-buckets) in the following way: (1) obtain the information about the access node (access edge server (AES)), and record this node in the corresponding k-bucket; and (2) send a request for querying the node ID of the requesting node to the access node, and, by this means, obtain the information about a series of other nodes adjacent to the requesting node through the access node; and finally, refresh all k-buckets of the requesting node by repeating the foregoing steps to ensure that the obtained node information is the latest.

It should be noted that when each node joins the system, if the requesting node initiates node query (FIND_NODE) for the first time, the access node is obtained in two modes: (1) The requesting node searches for the information about the access node of this domain in the information about the access nodes of each domain registered on the RRS. However, if all nodes that join the domain perform node query on the access node registered on the RRS, the load on the access node will be too heavy. Therefore, once a node joins the system successfully, another node already found in the same domain may be used as an access node subsequently. (2) The user node reserves a node which has been used for joining a domain previously so that the reserved node is available when the user node accesses the system next time.

The following describes a general node query method, that is, any node in the distributed network can send a node query request. For example, a node identified as "Z" (node Z) sends a request for querying a node identified as "X" (node X) to a node identified as "Y" (node Y). Especially, for the requesting node mentioned above, when the requesting node joins the distributed network, the requesting node sends a query request to another node such as node Y to query the requesting node itself, with a view to updating the node list of the requesting node, which is essential.

FIG. 7A shows a procedure for processing a FIND_NODE (X) request received by an access node identified as Y according to an embodiment of the present invention. The FIND_NODE(X) request may be a query request sent by node Z to query node X; or may be a query request sent by node X to query node X itself. As shown in FIG. 7A, the query procedure is as follows:

Step 701: The access node identified as "Y" receives a FIND_NODE(X) request from node Z.

Step 702: The access node Y uses a k-bucket update method to update the corresponding k-bucket, and judges whether the corresponding k-bucket has a node identified as "Z".

Step 703: The access node extracts M+N bits of the prefix from node ID "X" and node ID "Y" respectively to form X' and Y', where M refers to the valid length of the domain ID, namely, M is equal to FL mentioned above; and N refers to the valid length of the peer ID of the node, namely, N is equal to PL.

Step 704: The access node calculates the XOR result of X' and Y'. The XOR result is $A=X' \oplus Y'$.

Step 705: The access node judges whether A==0, and if A==0, the process proceeds to step 706; otherwise, the process proceeds to step 707.

Step 706: Because the node ID "Y" is the same as the node ID "X", the access node returns a response, indicating that the access node identified as "Y" is the node found by node Z. The procedure ends.

Step 707: The access node calculates $i=N+M-[\log(2,A)]-1$, where [ ] refers to rounding off.

Step 708: The access node judges whether $i \geq M+N$. If $i<M+N$, the process proceeds to step 709; if $i \geq M+N$, the process proceeds to step 714.

Step 709: The access node judges whether the k-bucket numbered i exists. If the k-bucket numbered i does not exist, the process proceeds to step 710; if the k-bucket numbered i exists, the process proceeds to step 711.

Step 710: Because i=i+1, the access node performs step 708.

Step 711: The access node searches the bucket numbered i for a certain number of nodes (the number is equal to a) adjacent to node X, namely, searches for the neighboring nodes. The XOR result of the node ID of each neighboring node and the node ID "X" is the smallest.

Step 712: The access node stores the information about the found nodes, and counts the total number of the nodes stored currently.

Step 713: The access node checks whether the total number of stored nodes is enough for meeting the desired number "k". If the total number of stored nodes is not enough for meeting the desired number "k", returns to step 710; if the total number of stored nodes is enough for meeting the desired number "k", the process proceeds to step 714.

Step 714: The access node judges whether information about a certain number of nodes is obtained. If no node information is obtained, the procedure proceeds to step 715; if information about a certain number of nodes is obtained, the procedure proceeds to step 716.

Step 715: The access node returns a response, indicating that node Y is the node closest to node X, and the process proceeds to step 717.

Step 716: The access node returns information about the obtained nodes.

In step 716, if the total number of obtained nodes until the last k-bucket is less than k, the access node returns information about the obtained less than k nodes.

Step 717: Node Z receives the information about neighboring nodes from the access node identified as "Y", and uses a k-bucket update method to update the k-bucket corresponding to node Z according to the information about the corresponding nodes.

Figure 7B:
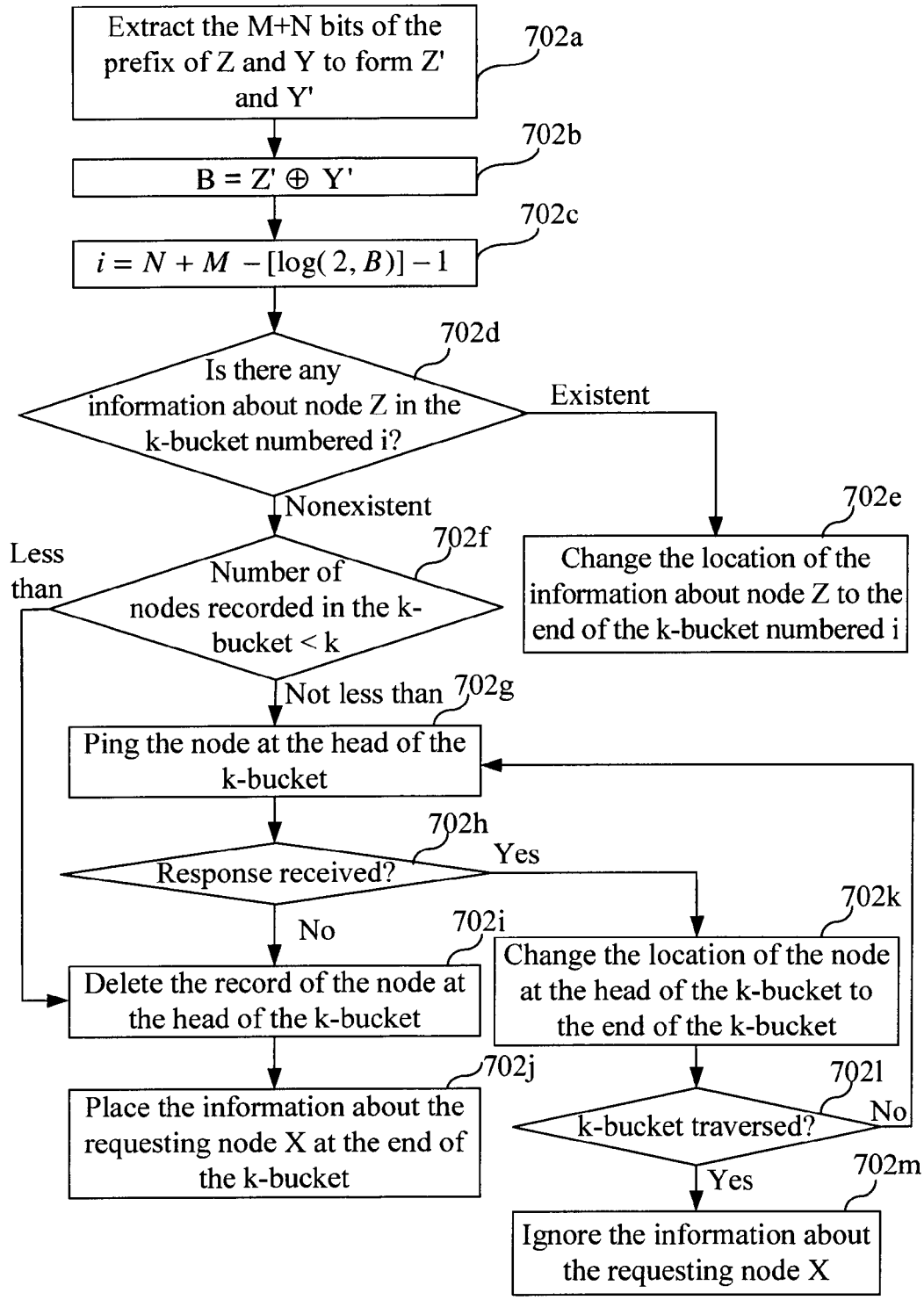
FIG. 7B is a flowchart of a method for updating a k-bucket according to an embodiment of the present invention.

FIG. 7B is a flowchart of a method for updating a k-bucket according to an embodiment of the present invention. In step 702, a k-bucket update method is used to update the information about node Z in the k-bucket corresponding to the receiving node; in step 717, the k-bucket update method is used to update the k-bucket corresponding to node Z according to the information about the neighboring nodes, where the information about the neighboring nodes is received by node Z and returned by the receiving node. As shown in FIG. 7B, taking step 702 as an example, the k-bucket update method includes the following steps:

Step 702a: Extract M+N bits of the prefix from node ID "Z" and node ID "Y" respectively to form E and Y', where M refers to the valid length of the domain ID, namely, M is equal to FL mentioned above; and N refers to the valid length of the peer ID of the node, namely, N is equal to PL.

Step 702b: Calculate the XOR result of Z' and Y'. The XOR result is $B=Z' \oplus Y'$.

Step 702c: Calculate $i=N+M-[\log(2,B)]-1$, where [ ] refers to rounding off.

Step 702d: Judge whether information about node Z exists in the k-bucket numbered i in the access node identified as "Y". If information about node Z exists in the k-bucket numbered i in the access node identified as "Y", the process proceeds to step 702e; if no information about node Z exists in the k-bucket numbered i in the access node identified as "Y", the process proceed to step 702f.

Step 702e: Change the location of the information about node Z to the end of the k-bucket numbered i, where the k-bucket records the node information by placing the information about the lately active node at the end of the k-bucket. End.

Step 702f: Judge whether the number of nodes recorded in the k-bucket numbered is less than k (generally, a k-bucket can accommodate information about k nodes). If the number of nodes recorded in the k-bucket numbered i is less than k, the process proceeds to step 702j because the k-bucket is not full; if the number of nodes recorded in the k-bucket numbered i is equal to or greater than k, the process proceeds to step 702g.

Step 702g: Ping the node at the head of the k-bucket to detect whether the node is still online.

Step 702*h*: Judge whether the node at the head of the k-bucket responds to the operation. If the node at the head of the k-bucket does not respond to the operation, the process proceeds to step 702*i*; if the node at the head of the k-bucket responds to the operation, the process proceeds to step 702*k*.

Step 702*i*: Delete the record of the node at the head of the k-bucket.

Step 702*j*: Place the information about the requesting node X at the end of the k-bucket. The process ends.

Step 702*k*: Change the location of the node at the head of the k-bucket to the end of the k-bucket.

Step 702*l*: Judge whether all nodes in the k-bucket have been traversed. If not all nodes in the k-bucket have been traversed, return to step 702*g*; if all nodes in the k-bucket have been traversed, the process proceeds to step 702*m*.

Step 702*m*: Ignore the information about the requesting node X. End.

In step 717, after the k-bucket corresponding to node Z is updated with the information about the several nodes obtained in step 717, node Z selects several nodes which have never sent the FIND_NODE(X) request among all the known nodes closest to node X again, and uses the selected nodes as access nodes and sends the FIND_NODE(X) request to the access nodes. The access nodes that receive the FIND_NODE (X) request repeat steps 701-717 in FIG. 7A, and return information about the nodes closest to node X. The foregoing steps are repeated until all the access nodes believe they are closest to node X or are the target node of the query and return their own node information to node Z.

In the foregoing query process, any node that does not respond to node Z in time will be excluded immediately, thus ensuring that the nearest nodes finally obtained by the requesting node X are active.

The distributed network construction method in the embodiment above primarily deals with the node query method. The node query method is rather important when the requesting node wants to join the distributed network after obtaining its node ID. For example, node Z is an access node or a routing node, and node X is a requesting node; the requesting node uses the node query method in steps 701-717 above to find the information about the nodes closest to its own node ID "X", and adds the information about the nodes to the node list (namely, a k-bucket) corresponding to the requesting node. Now, the requesting node that needs to join the distributed network is correlated with other nodes in the distributed network.

Figure 8:
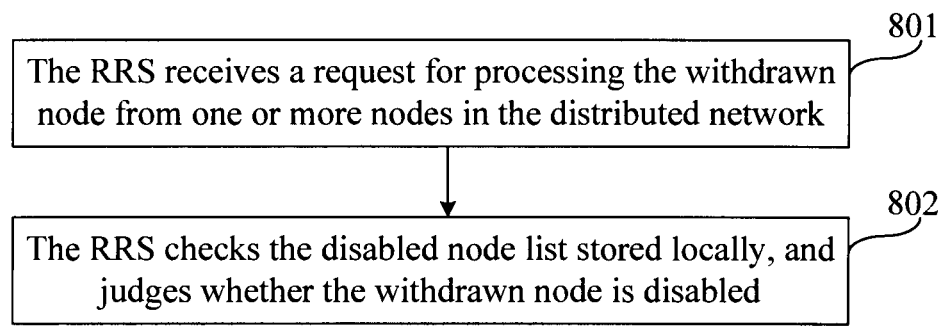
FIG. 8 is a flowchart of a distributed network construction method according to a fourth embodiment of the present invention.

FIG. 8 is a flowchart of a distributed network construction method according to the fourth embodiment of the present invention. As shown in FIG. 8, in the foregoing embodiment, a correlation is set up between the requesting node and the neighboring nodes as soon as the requesting node is added to the node list. In the distributed network, if other nodes fail to receive the response from a correlated node because this node may have withdrawn from the distributed network, the distributed network manages this node and its node information through the following steps:

Step 801: The RRS receives a request for processing the withdrawn node from one or more nodes in the distributed network.

In the distributed network, the interaction between nodes is fully distributed, and the node ID is assigned to every node according to the algorithm specified herein. Therefore, after a node is withdrawn from the network, other nodes may learn the information about the neighboring nodes of the withdrawn node through periodical heartbeat messages. It is assumed that one withdrawn node exists in the distributed network. Because many other nodes have information about the withdrawn node, they will send heartbeat messages periodically to keep in contact with the withdrawn node. When certain nodes find that no response to sent heartbeat messages is received, the nodes believe that the withdrawn node is disabled, and request the RRS to process the withdrawn node.

Step 802: The RRS checks the disabled node list stored locally, and judges whether the withdrawn node is disabled. The judgment comes in the following scenarios:

If the disabled node list includes no information about the withdrawn node, the RRS creates the withdrawn node in the disabled node list, and judges whether the withdrawn node is disabled. If determining that the withdrawn node is disabled, the RRS writes the node ID of the withdrawn node into the FreePeerID_List of the domain that covers the withdrawn node, and therefore, the node ID can be assigned to a new node when the new node joins the domain.

If the disabled node list includes the information about the withdrawn node and the RRS has never judged whether the withdrawn node is disabled, the RRS judges whether the withdrawn node is disabled. If determining that the withdrawn node is disabled, the RRS writes the node ID of the withdrawn node into the FreePeerID_List of the domain that covers the withdrawn node, and therefore, the node ID may be assigned to a new node when the new node joins the domain.

The data structure of the disabled node list is as follows:

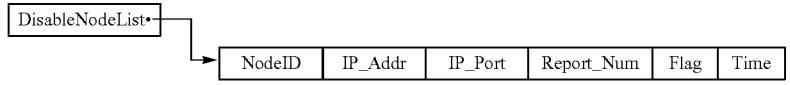

40

In the data structure above, NodeID, IP_Addr, and IP_Port represent the node ID, IP address, and IP port of the disabled node respectively; Report_Num is the total number of nodes that report the disabled state of the withdrawn node. Supposing that RN is a threshold value of Report_Num, if Report_Num is greater than or equal to RN, the RRS determines whether the withdrawn node is really disabled. Flag indicates whether the withdrawn node is disabled; Time indicates the time of creating the record of the withdrawn node. When the RRS searches the disabled node list for the withdrawn node which needs to be processed as requested by other nodes, the RRS determines that the withdrawn node exists in the disabled node list only if NodeID, IP address, and IP port are matched.

Figure 9:
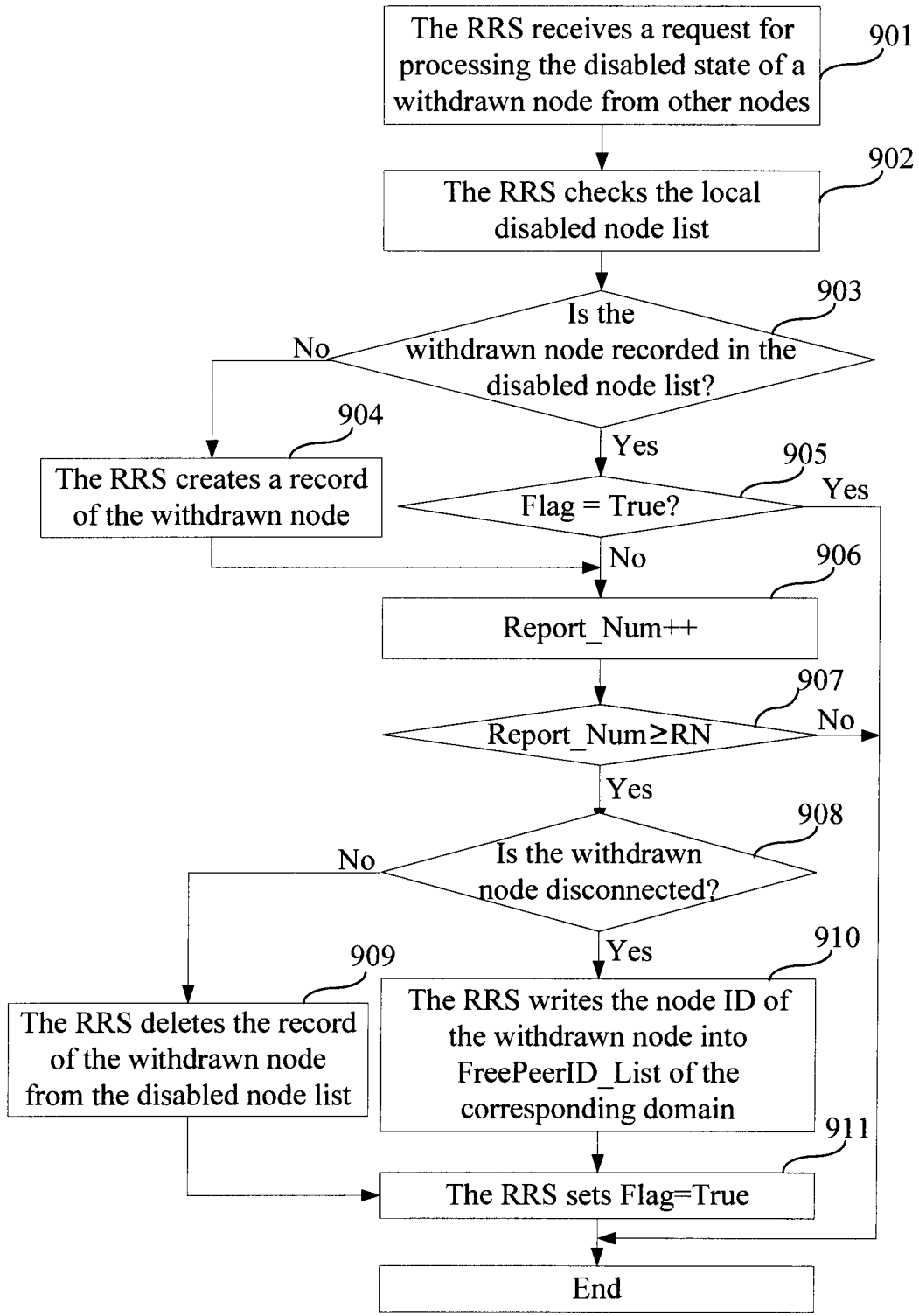
FIG. 9 shows how an RRS processes a withdrawn node according to an embodiment of the present invention.

FIG. 9 shows how an RRS processes a withdrawn node according to an embodiment of the present invention. As shown in FIG. 9, the processing procedure is as follows:

Step 901: The RRS receives a request for processing the disabled state of a node (referred to as a withdrawn node here) from other nodes.

Step 902: The RRS checks the local disabled node list. The data structure of the disabled node list is shown above.

Step 903: The RRS judges whether the withdrawn node is recorded in the disabled node list. If the withdrawn node is not recorded in the disabled node list, the process proceeds to step 904; if the withdrawn node is recorded in the disabled node list, the process proceeds to step 905.

Step 904: The RRS creates a record of the withdrawn node in the local disabled node list, initializes "Report_Num" and "Time" in the list, and then proceeds to step 906.

Step 905: The RRS judges whether the value of Flag is "True", namely, whether the recorded withdrawn node is disabled; if Flag=True, it indicates that the withdrawn node is disabled, and the procedure ends; otherwise, the procedure proceeds to step 906.

Step 906: Report_Num increases by 1, indicating that one more node requests the RRS to process the withdrawn node.

Step 907: The RRS judges whether Report_Num is greater than or equal to RN. If Report_Num is less than RN, the procedure ends; if Report_Num is greater than or equal to RN, the procedure proceeds to step 908.

Step 908: The RRS detects information about the withdrawn node, and judges whether the withdrawn node is disconnected. If the withdrawn node is not disconnected, the procedure proceeds to step 909; if the withdrawn node is disconnected, the procedure proceeds to step 910.

Step 909: The RRS deletes the record of the withdrawn node from the disabled node list. The procedure ends.

Step 910: The RRS writes the node ID of the withdrawn node into the corresponding FreePeerID_List in the domain.

Step 911: The RRS sets Flag=True. The procedure ends.

In the procedure for managing the withdrawn node, the RRS manages the node information recorded in the list by scanning the disabled node list periodically, judges whether the node information recorded in the disabled node list has expired, and deletes the expired node record. For example, the RRS sets an expired node to be a node which is not updated within more than two scan periods, and deletes the node information of such nodes.

This embodiment primarily deals with the procedure for managing withdrawn nodes in the distributed network, and further improves the distributed network construction method.

Figure 10A:
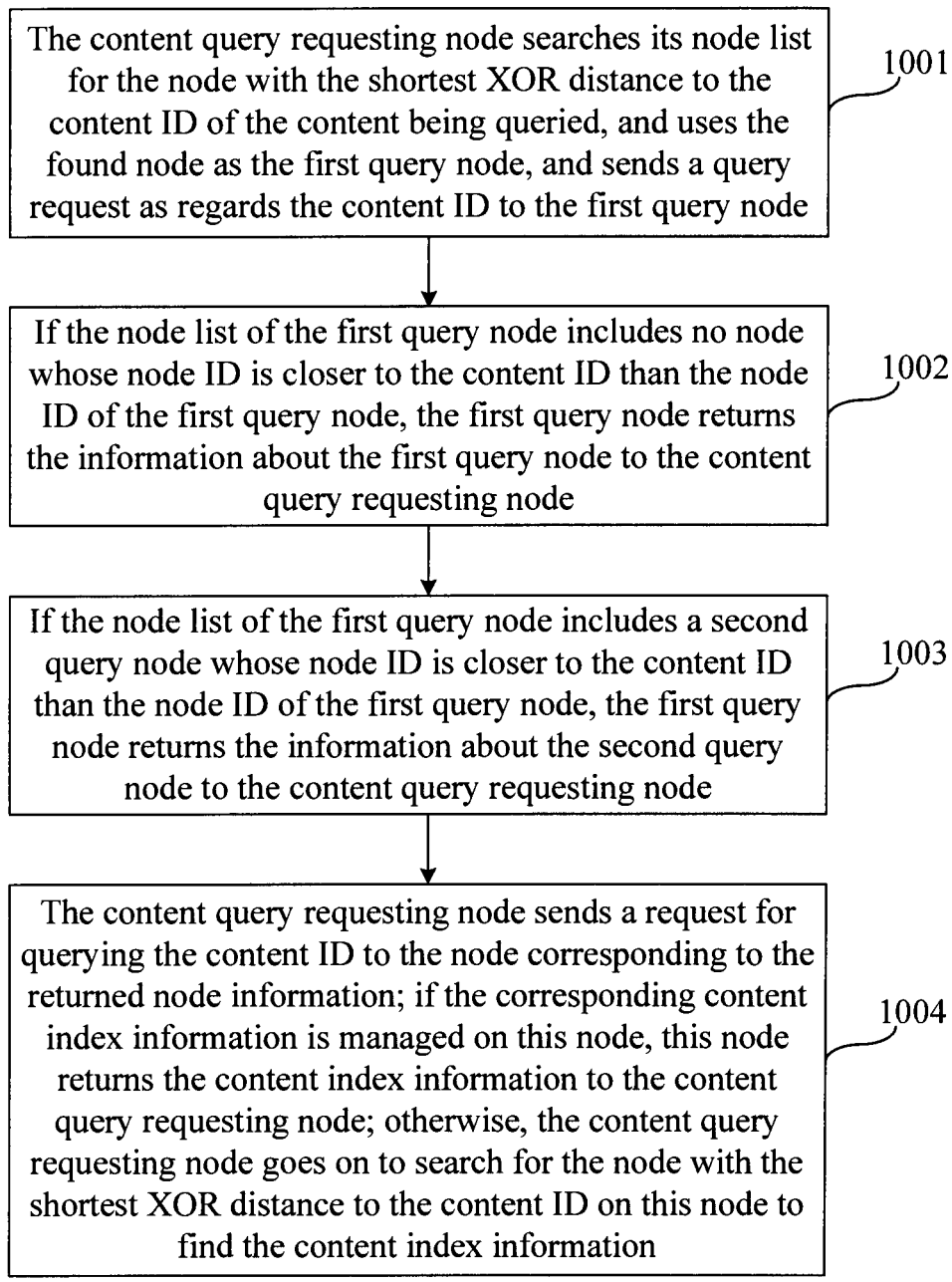
FIG. 10A is a flowchart of a distributed network construction method according to a fifth embodiment of the present invention.

FIG. 10A is a flowchart of a distributed network construction method according to the fifth embodiment of the present invention. In the distributed network, the content managed on each ES has a corresponding content ID. The ES registers the information about the managed content and the content ID onto the CIS in the network shown in FIG. 1, and stores the content index information onto one or more nodes corresponding to the node ID closest to the content ID. In this way, the content index information managed by the node which stores the content ID indicates the ES which stores the content corresponding to the content index information. Thereby, once the content ID is found, the RRS knows the ES which stores the content index information and the content corresponding to the content index information. When a node or a user node queries content, the node searches for the content on the CIS in the network shown in FIG. 1, and obtains a content ID corresponding to the content. Afterward, the node or user node finds the node that manages the content ID according to the obtained content ID, and obtains the content index information from such a node, namely, obtains the ES that stores the corresponding content. The node or user node is defined as a content query requesting node, and the process of querying the node corresponding to the node ID closest to the content ID is similar to the node query process described above, and includes the following steps, as shown in FIG. 10A:

Step 1001: The content query requesting node searches its node list for the node whose node ID is closest to the content ID of the content being queried, and uses the found node as the first query node, and sends a query request including the content ID to the first query node.

Step 1002: If the node list of the first query node includes no node whose node ID is closer to the content ID than the node ID of the first query node, the first query node returns the information about the first query node to the content query requesting node.

Step 1003: If the node list of the first query node includes a second query node whose node ID is closer to the content ID than the node ID of the first query node, the first query node returns the information about the second query node to the content query requesting node.

Step 1004: The content query requesting node sends a request for querying the content ID to the node corresponding to the returned node information. If the corresponding content index information is managed on this node, this node returns the content index information to the content query requesting node; if no corresponding content index information is managed on this node, the content query requesting node goes on to search for the node whose node ID is closest to the content ID on this node to find the content index information. The query steps are the same as steps 1001-1003 above.

Specifically, in the prior art, it is assumed that: n domains exist in the distributed network; each domain has a randomly obtained domain ID whose length is M bits; and the relations between the domains are $F(1)<F(2)<F(3)<\ldots<F(n)$. However, such domains are distributed unevenly, and the bit value of the domain ID is not continuous, namely, $F(i+1)!=F(i)+1$. Even the bit value of the domain ID of one (such as domain i) is sharply different from the bit value of the domain ID of another domain (such as domain i+1), namely, the two domains are far away from each other. Consequently, the index information of all content corresponding to the following content IDs in the distributed network will be uploaded to and managed by the node with the greatest node ID in domain i: The bit value of the M bits of the prefix of such content IDs falls between the bit value of the domain ID of domain i and the bit value of the domain ID of domain i+1. Thus the node with the greatest node ID in domain i is overloaded. By contrast, in the method for querying the content ID in this embodiment of the present invention, the content ID to be added to domain i is matched again, namely, the method searches for the neighboring nodes in domain i according to the prefix of the valid length N of the peer ID after the valid length M of the domain ID of the content ID. In this way, the content IDs added to domain i are distributed onto the nodes in domain i evenly, and the load on the node with the greatest node ID in domain i is relieved.

Figure 10B:
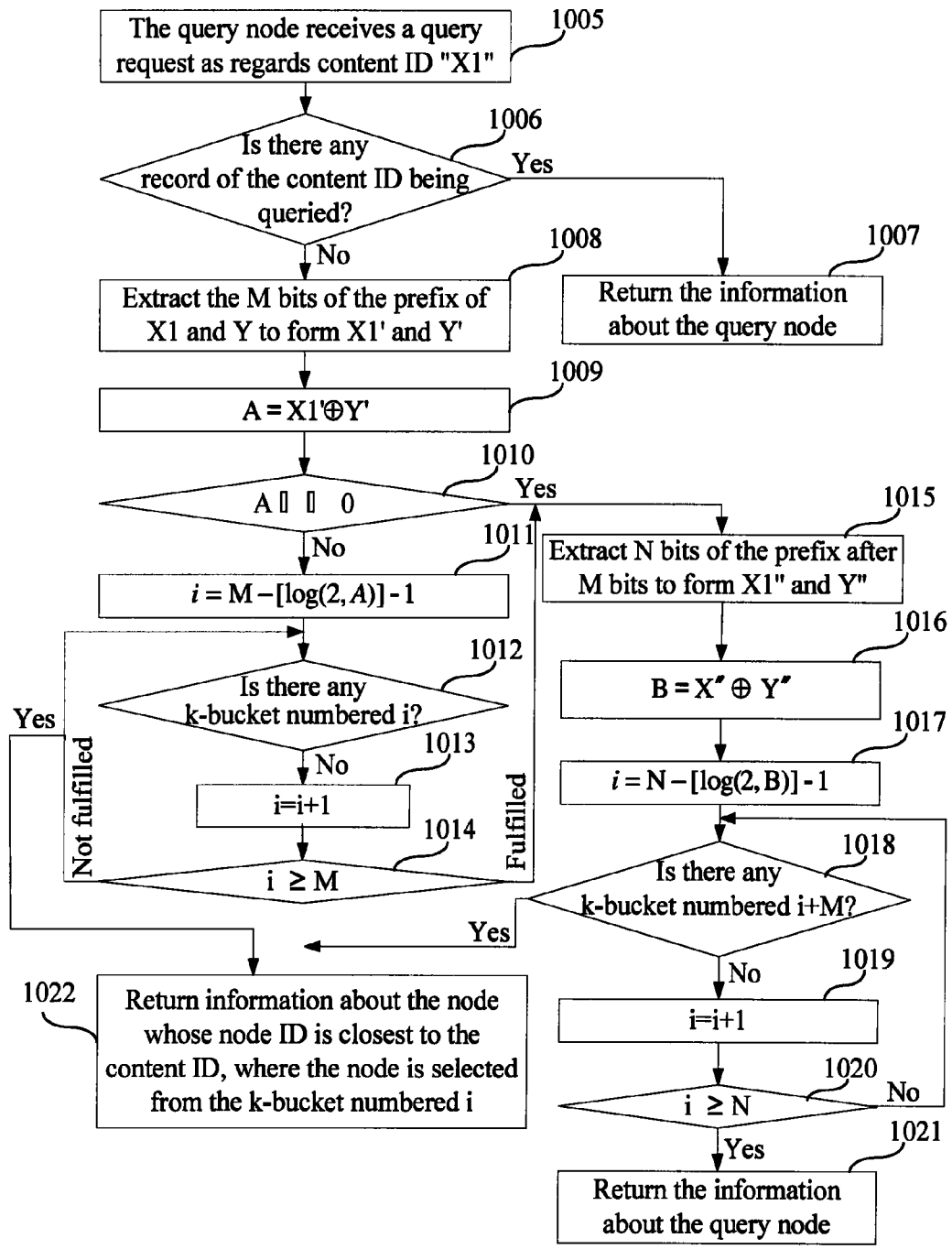
FIG. 10B is a flowchart of a content query method according to an embodiment of the present invention.

FIG. 10B is a flowchart of a content query method according to an embodiment of the present invention. As shown in FIG. 10B, the method includes the following steps:

Step 1005: The query node identified as "Y" receives a query request as regards the content ID "X1" from the content query requesting node.

Step 1006: The query node judges whether the content ID queried by the content query requesting node is recorded locally. If the content ID queried by the content query requesting node is recorded locally, the process proceeds to step 1007; if the content ID queried by the content query requesting node is not recorded locally, the process proceeds to step 1008.

Step 1007: The query node returns its own node information. The query node identified as "Y" is the node whose node ID is closest to the content ID. The query is ended.

Step 1008: The query node extracts M bits of the prefix from the ID "X1" and the ID "Y" respectively to form X1' and Y', where M refers to the valid length of the domain ID, namely, M is equal to FL mentioned above.

Step 1009: The query node calculates the XOR result of X1' and Y'. The XOR result is A=X1'⊕Y'.

Step 1010: The query node judges whether A==0. If A==0, the process proceeds to step 1015; otherwise, the process proceeds to step 1011.

Step 1011: The query node calculates i=M−[log(2,A)]−1, where [ ] refers to rounding off.

Step 1012: The query node judges whether the k-bucket numbered i exists in the query node. If the k-bucket numbered i does not exist in the query node, the process proceeds to step 1013; if the k-bucket numbered i exists in the query node, the process proceeds to step 1022.

Step 1013: i=i+1.

Step 1014: The query node judges whether i≧M. If i<M, returns to step 1012; if i≧M, the process proceeds to step 1015.

Step 1015: The query node extracts N bits of the prefix after the M bits from the ID "X1" and the ID "Y" respectively to form X1" and Y", where N refers to the valid length of the peer ID of the node, namely, N is equal to PL.

Step 1016: The query node calculates the XOR result of X1" and Y". The XOR result is B=X1"⊕Y".

Step 1017: The query node calculates i=N−[log(2,B)]−1, where [ ] refers to rounding off.

Step 1018: The query node judges whether the k-bucket numbered i+M exists in the query node. If the k-bucket numbered i+M does not exist in the query node, the process proceeds to step 1019; if the k-bucket numbered i+M exists in the query node, the process proceeds to step 1022.

Step 1019: i=i+1.

Step 1020: The query node judges whether i≧N. If i<N, returns to step 1018; if i≧N, the process proceeds to step 1021.

Step 1021: The query node returns its own node information. The query node identified as "Y" is the node whose node ID is closest to the content ID. The query is ended.

Step 1022: The query node returns the information about the node whose node ID is closest to the content ID, where the node is selected from the k-bucket numbered i. The query is ended.

The node query process as regards the content ID for the purpose of registering the content ID corresponding to the content stored in the ES onto the node closest to the content ID is similar to the node query process described in FIG. 10A and FIG. 10B above. The only difference is: In the content ID query process, the closest node is found first, and then content ID is obtained from the node; in the content ID registration process, the closest node is found first, and then the content ID is registered onto the node.

In another scenario, it is assumed that a new domain "t" (namely, a first domain t) is added between domain i and domain i+1, and that a node m (namely, a first node m) is added to domain t. If the first domain t includes only the first node m, the first node m finds all the nodes in the second domain whose domain ID is closest to the domain ID of the first domain t, namely, in this embodiment, finds all the nodes in domain i, and obtains the content index information recorded in all nodes in the second domain i, where the value of the M bits of the prefix of the content ID corresponding to such content index information is greater than or equal to the domain ID of the first domain t. If the first domain t includes other nodes, the first node m finds the second node n whose node ID is closest to the node ID of the first node m, and obtains the content index information recorded in the second node n, where the value of the N bits of the prefix after the M bits of the content ID corresponding to such content index information is greater than or equal to the peer ID of the first node m.

Figure 10C:
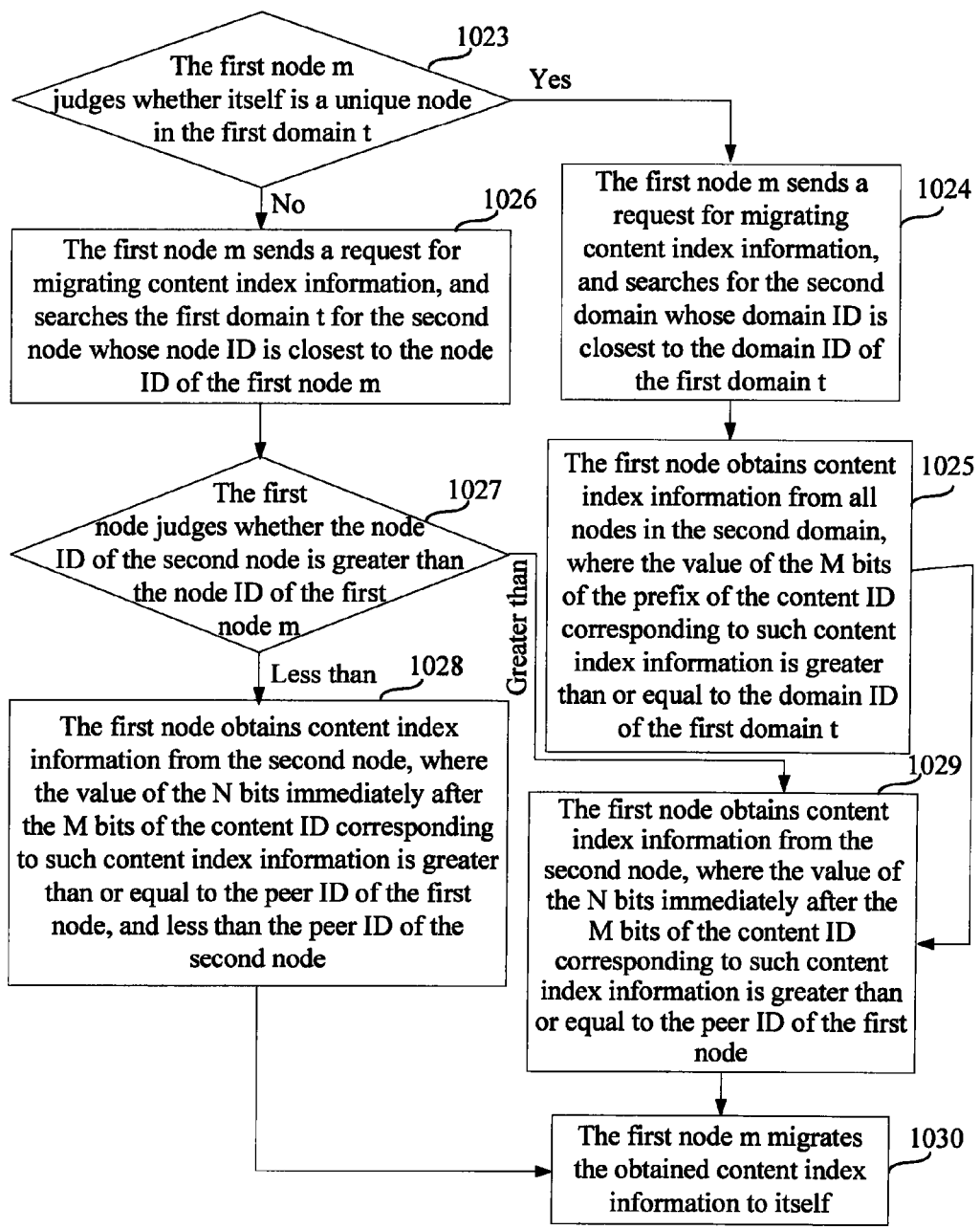
FIG. 10C is a flowchart of a method for migrating content index information according to an embodiment of the present invention.

Specifically, FIG. 10C is a flowchart of a method for migrating content index information in an embodiment of the present invention. As shown in FIG. 10C, the method includes the following steps:

Step 1023: The first node m judges whether itself is a unique node in the first domain t. If the first node itself is a unique node in the first domain t, the process proceeds to step 1024; if the first node itself is not a unique node in the first domain t, the process proceeds to step 1026.

Step 1024: The first node m sends a request for migrating content index information, and searches for the second domain whose domain ID is closest to the domain ID of the first domain t.

Step 1025: The first node obtains content index information from all nodes in the second domain, where the value of the M bits of the prefix of the content ID corresponding to such content index information is greater than or equal to the domain ID of the first domain t. The procedure proceeds to step 1030.

Step 1026: The first node m sends a request for migrating content index information, and searches the first domain t for the second node whose node ID is closest to the node ID of the first node m.

Step 1027: The first node judges whether the node ID of the second node is greater than the node ID of the first node m. If the node ID of the second node is greater than the node ID of the first node m, the process proceeds to step 1028; if the node ID of the second node is equal to or less than the node ID of the first node m, the process proceeds to step 1029.

Step 1028: The first node obtains content index information from the second node, where the value of the N bits immediately after the M bits of the content ID corresponding to such content index information is greater than or equal to the peer ID of the first node, and less than the peer ID of the second node. The procedure proceeds to step 1030.

Step 1029: The first node obtains content index information from the second node, where the value of the N bits immediately after the M bits of the content ID corresponding to such content index information is greater than or equal to the peer ID of the first node.

Step 1030: The first node m migrates the obtained content index information to itself.

The distributed network construction method in this embodiment primarily deals with the method of searching for and registering the specific content ID in the process of constructing the distributed network. The process of searching for the content ID is essentially a process of searching for the node.

Figure 11:
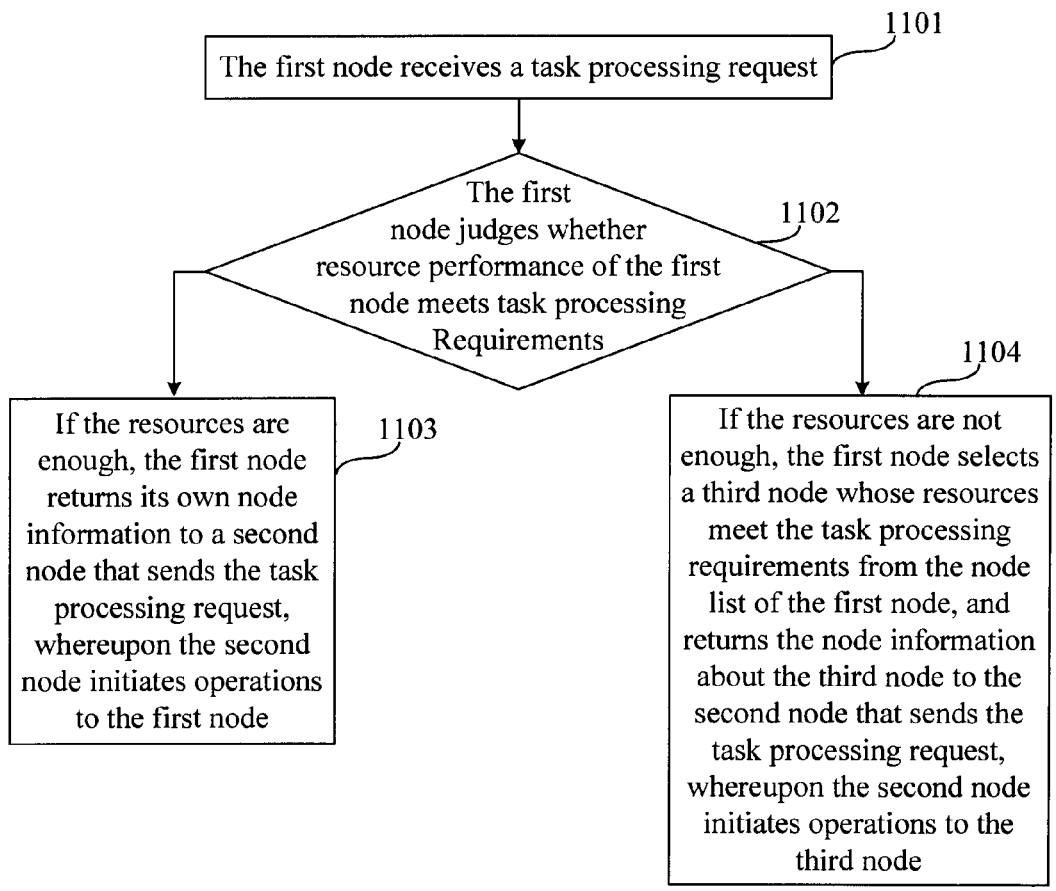
FIG. 11 is a flowchart of a task processing method in a distributed network according to an embodiment of the present invention.

FIG. 11 is a flowchart of a task processing method in a distributed network according to an embodiment of the present invention. The user node or ES may have a task processing request at certain moments. For example, a user uploads the storage content; due to too heavy loads on the node, the node needs to migrate content; or, the local domain needs to add or delete duplicates. Some nodes need to be specified for processing such requests, and the resources of such nodes should be enough for processing the requests. Therefore, at the time of assigning tasks to the nodes, it is necessary to measure the performance of the nodes so that the nodes compliant with the resource performance requirements can be found before the task is processed, and that the loads can be balanced among the nodes. As shown in FIG. 11, on the basis of the distributed network construction method above, the task can be processed more quickly and efficiently in a domain, as detailed below:

Step 1101: The first node receives a task processing request such as a request for uploading, adding or deleting content.

Step 1102: The first node judges whether its own resource performance meets task processing requirements.

Step 1103: If the resources are enough, the first node returns its own node information to a second node that sends the task processing request, where the second node initiates operations to the first node.

Step 1104: If the resources are not enough, the first node selects a third node whose resources meet the task processing requirements from the node list of the first node, and returns the node information about the third node to the second node that sends the task processing request, where the second node initiates operations to the third node.

The first node prefers the node whose k-bucket ID is greater than or equal to M in the node list (namely, prefers the node in the same domain).

For example, when a user node wants to upload content, it is necessary to find the destination node of the content before the content uploading request is sent. The process of finding the destination node includes the following steps:

Step a: The user node sends a request for uploading content to the access node (namely, an AES).

Step b: The AES judges whether the local resources are enough for uploading the content. If the local resources are enough for uploading the content, the process proceeds to step c; if the local resources are not enough for uploading the content, the process proceeds to step d.

Step c: The information about the AES is returned to the user node, and then the user node uploads the content.

Step d: The AES selects the k-bucket whose ID is greater than or equal to M among the local k-buckets; selects n (n≧1) nodes in each k-bucket consecutively, starting from the k-bucket numbered i; and requests each node to feed back resource utilization information. If the resource information fed back by n nodes in the k-bucket numbered i is not enough for uploading the content, the AES finds n more nodes from the k-bucket numbered (i+1) % (M+N), and then counts the available resources until the AES finds the node which has enough resources for processing the content uploading request sent by the user node. If no such node exists, the AES returns request failure information.

Step e: The AES returns the information about the node that has enough resources for processing the content uploading request to the user node.

Step f: The user node initiates an operation request to the node that has enough resources for processing the content uploading request sent by the user node.

Here, the user node may be any ES. In this case, because the ES itself can serve as an AES to perform the operations such as node query, the AES is also the ES.

In the task processing method in the distributed network constructed according to the distributed network construction method herein, because the domains are managed separately in the distributed network, a proper node can be selected quickly among the nodes in a domain to process the task within the domain.

Figure 12:
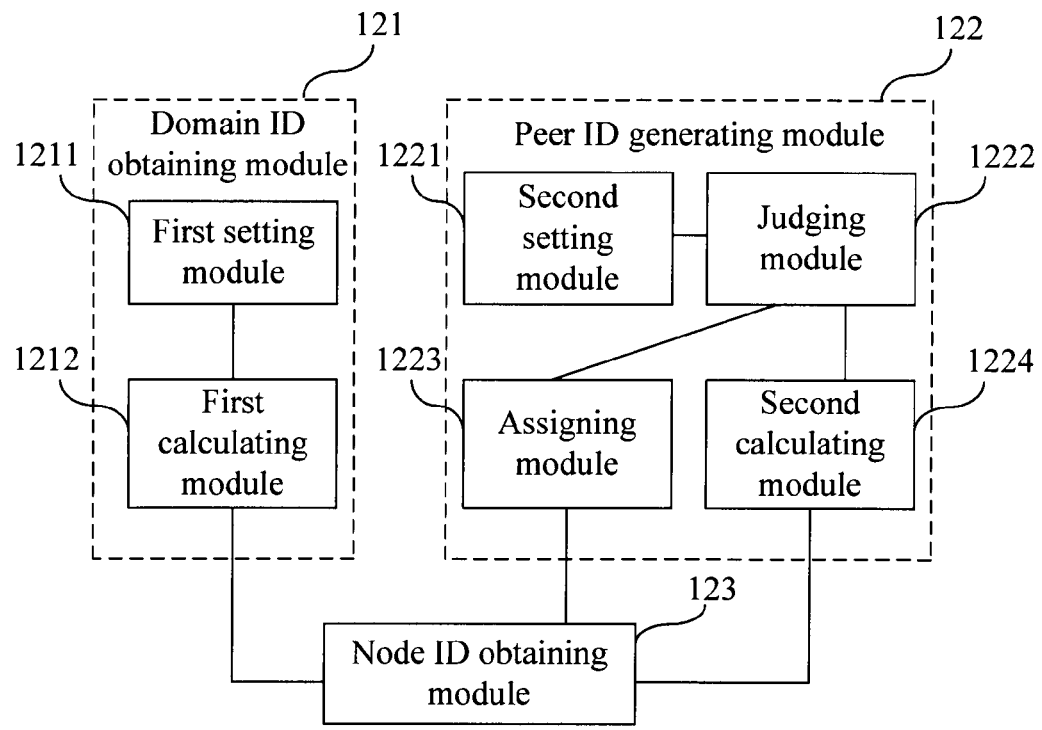
FIG. 12 shows a structure of a node ID generation apparatus according to an embodiment of the present invention.

FIG. 12 shows a structure of a node ID generation apparatus according to an embodiment of the present invention. As shown in FIG. 12, the node ID generation apparatus includes: a domain ID obtaining module 121, adapted to determine a domain that covers a requesting node according to an address of the requesting node which requests to join a distributed network, and obtain a domain ID; a peer ID generating module 122, adapted to generate a peer ID of the requesting node according to the number of peers of the domain; and a node ID obtaining module 123, adapted to concatenate the domain ID with the peer ID to form a node ID of the requesting node.

The domain ID obtaining module 121 may further include a first setting module 1211 for setting the valid length M of the domain ID, where M is a positive integer; and a first calculating module 1212 for expressing the number of existing domains in the distributed network as M bits, and generating the domain ID of the domain according to the M bits. The peer ID generating module 122 may further include: a second setting module 1221, adapted to set the valid length N of the peer ID, where N is a positive integer; a judging module 1222, adapted to judge whether a free peer ID exists; an assigning module 1223, adapted to assign the free peer ID to the requesting node; and a second calculating module 1224, adapted to: obtain the number of peers from the domain, convert the number into corresponding N bits, and generate a peer ID of the requesting node according to the N bits.

The detailed process of generating the node ID through the node ID generation apparatus in this embodiment is expounded in the distributed network construction method above. At the time of constructing a distributed network in this embodiment, through the node ID generation apparatus, the node ID is generated according to the distribution of domains in the network and the distribution of the peers in the domain, and therefore, the node distribution is more balanced in the distributed network, and the loads are more balanced among the nodes.

FIG. 1 shows a distributed network scenario according to an embodiment of the present invention. The distributed network includes an RRS, a CIS and an ES.

The RRS is adapted to: determine a domain that covers a requesting node according to an address of the requesting node which requests to join a distributed network, and obtain a domain ID; generate a peer ID of the requesting node according to the number of peers of the domain; and concatenate the domain ID with the peer ID to form a node ID of the requesting node.

The CIS is adapted to: add, delete and deliver the content uploaded to the distributed network system, register the content ID corresponding to the content, receive a content query request sent by a user or the ES, process the content being queried, and return the content ID corresponding to the content being queried.

Figure 13:
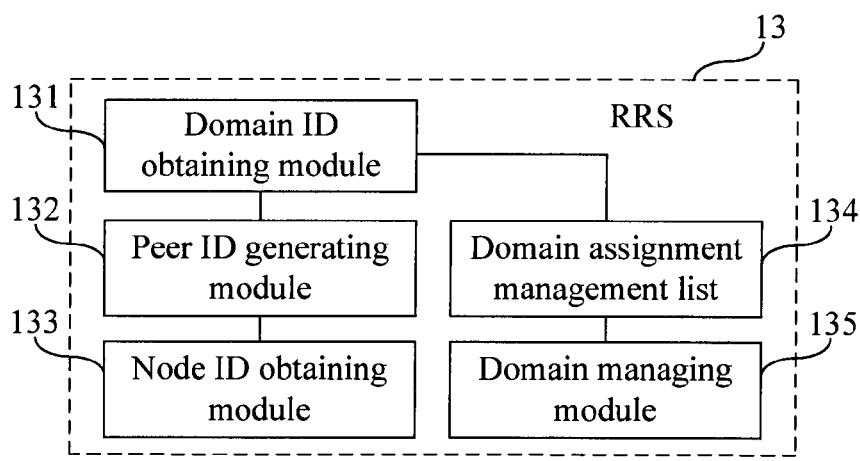
FIG. 13 shows a structure of an RRS in a distributed network system according to an embodiment of the present invention.
Figure 14:
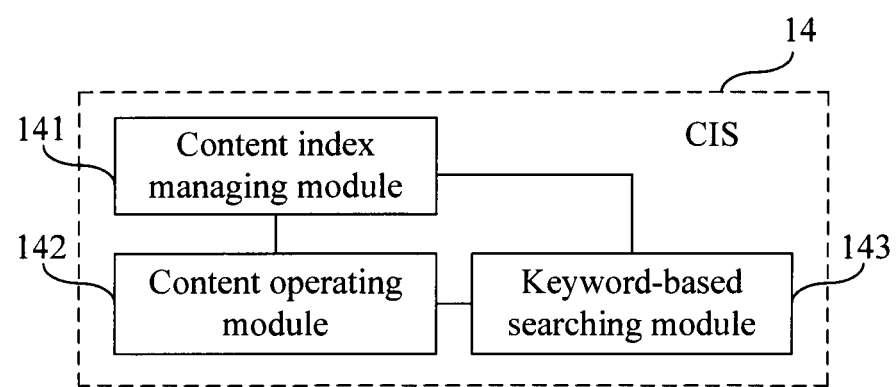
FIG. 14 shows a structure of a CIS in a distributed network system according to an embodiment of the present invention.
Figure 15:
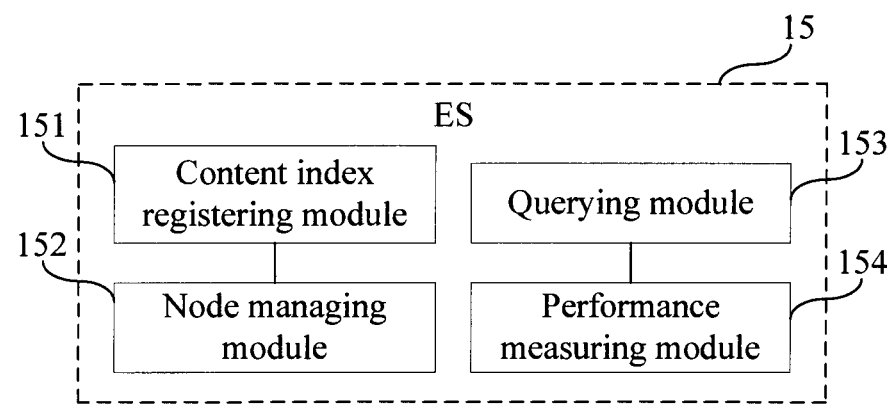
FIG. 15 shows a structure of an ES in a distributed network system according to an embodiment of the present invention.

The ES is adapted to: calculate a node ID of the ES according to the domain ID obtained from the RRS, or obtain the node ID of the ES from the RRS, where the node ID of the ES is calculated out by the RRS; store content corresponding to a content ID; search for content index information corresponding to the content registered on one or more ESs whose node ID is closest to the content ID, and search for an ES which stores the content index information desired by this ES; maintain a node list, initiate node query to neighboring ESs, and measure and record their performance. FIG. 13 shows the structure of the RRS in the distributed network scenario shown in FIG. 1; FIG. 14 shows the structure of the CIS; FIG. 15 shows the structure of the ES; and the combination of FIG. 13 to FIG. 15 makes up the architecture of the distributed network shown in FIG. 1. The following describes FIG. 13 to FIG. 15 in detail.

FIG. 13 shows a structure of an RRS in a distributed network system according to an embodiment of the present invention. As shown in FIG. 13, the RRS 13 includes: a domain ID obtaining module 131, adapted to identify the domain that covers an ES or a user node according to an assigned domain ID when the ES or user node logs in to the distributed network (namely, when the ES or user node joins the distributed network), and calculate the domain ID that should be assigned to a domain newly added to the distributed network; a peer ID generating module 132, adapted to calculate the peer ID of each node newly added to a domain, where the calculation may be based on the method of calculating the peer ID in the foregoing embodiment and is primarily based on information about nodes in a domain; and a node ID obtaining module 133, adapted to concatenate the domain ID with the peer ID to form the node ID of the node which logs in to the network system. It should be noted that the peer ID generating module 132 and the node ID obtaining module 133 may also be transplanted to the user node, and that the user node can calculate its own node ID once the user node obtains the domain ID and the number of peers in the domain of the user node from the RRS.

The RRS 13 may further include a domain assignment management list 134, which may be configured by an administrator. For example, when a new domain joins the distributed network, the administrator needs to configure the domain in the domain assignment management list 134, and the traditional mode is to determine the domain that covers the user node according to the address segment or the location information provided by the user node. The RRS 13 may further include a domain managing module 135, which is adapted to manage the distribution of domains and the distribution of nodes in the domain. The managed information includes the number of domains, valid length of the domain ID, and domain list information. The data structure is as follows:

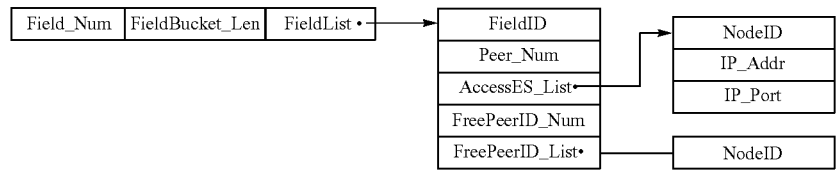

In the data structure above, Domain_Num is the number of domains currently existent in the system. DomainBucket_Len is the number of valid bits of each current domain ID, and may be set as a constant. Generally, DomainBucket_Len=log DomainNum DomainList records information about each domain in the system, and DomainID is a string composed of calculated bits, which are generally 32 bits. Peer_Num is the number of ES nodes in this domain. AccessES_List is a list of AESs which are several ESs randomly selected from the ES nodes that join this domain. FreePeerID_Num is the number of nodes which are disconnected. FreePeerID_List is a list of peer IDs of the disconnected nodes. When a new node joins the network or a disconnected node recovers the connection, the node ID can be selected from the FreePeerID_List to serve as the peer ID in the node ID of the node directly. When a node joins the distributed network system and the node ID of the node needs to be calculated, the parameters managed in the domain managing module 135 are useful.

FIG. 14 shows a structure of a CIS in a distributed network system according to an embodiment of the present invention. As shown in FIG. 14, the CIS 14 may include a content index managing module 141, a content operating module 142, and a keyword-based searching module 143.

The content index managing module 141 is adapted to: register all content uploaded to the system, record metadata information of the content, and judge whether the uploaded content has been registered in the system.

The content operating module 142 is adapted to: send a request for deleting content when the user node detects that the content is illegal, and work with a specified content delivery server to send content to a destination domain when the content provider needs to inject content in batches.

The keyword-based searching module 143 is adapted to implement fuzzy search on the CIS so that the user can select the desired content among the search results and obtain the content ID of the content.

FIG. 15 shows a structure of an ES in a distributed network system according to an embodiment of the present invention. As shown in FIG. 15, the ES 15 includes: a content index registering module 151, adapted to record and manage the content index information corresponding to the content ID closest to the node ID of the ES 15; a node managing module 152, adapted to maintain the node lists of the ES; and a querying module 153, adapted to initiate node query to the neighboring ESs, and query the content ID corresponding to the desired content; and a performance measuring module 154, adapted to measure and record performance of the ES.

The content index registering module 151 records the information about the node whose node ID is closest to the content ID. The data structure is illustrated below. In the data structure, ContentID is the content ID corresponding to the content stored in another node; and the NodeID stored in the PeerList is the ID of another node that stores the content.

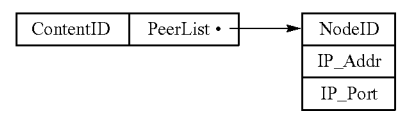

The node managing module 152 calculates the content ID of the locally stored content, and finds the node whose node ID is closest to the content ID for registering the content ID. This module also maintains the node list, namely, the list of neighboring nodes. The maintenance of neighboring nodes is primarily maintenance of the k-buckets on this node. In this embodiment, the valid length of the domain ID and the valid length of the node ID are controlled. For scalability of the distributed network, an upper threshold such as $2^n$ is set for the number of domains at the beginning. Generally, n is set according to the domain assignment in the distributed network. For future expansion, n may be a large number; but n also needs to be appropriate to prevent too many empty k-buckets in the nodes that join the domain (the range recorded by certain maintained k-buckets covers no node information). The n is known as the valid length of the domain, namely, the maximum ID in the node list maintained by this node and designed to record node information in other domains. In this way, in the node list of this node, the k-buckets that range from k-bucket 0 to k-bucket n−1 record node information in other domains, and the k-buckets whose ID is greater than n record the node information about the nodes in the same domain that covers this node. The data structure of k-bucket i of this node may be expressed as:

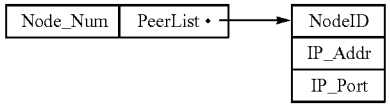

The performance measuring module 154 is adapted to measure current performance of the ES 15. The current performance indicators include: uplink free bandwidth, downlink free bandwidth, CPU utilization, memory utilization, and free storage space. The performance measuring module sends the relevant measurement data to the node that requests the performance indicators according to different performance requests, for example, returns the following performance measurement data when a node sends the following requests to this node:

(1) content uploading request—node with many free resources in this domain, where the resources include: hard disk, downlink bandwidth, and memory;

(2) content migration request—node to which the content is migrated, whose resources include: hard disk, downlink bandwidth, and memory; and node from which the content is migrated, whose resources include uplink bandwidth;

(3) content deletion request—node with stringent resources; and (4) content downloading request—resources such as the uplink bandwidth and memory of the node.

The foregoing embodiment of the distributed network system deals with the connection relations between the devices in the system, and how each device operates and manages the information on other devices. The detailed operation methods, for example, calculation of the node ID of the ES, node query and content query, and node list configuration and management, are expounded in the method embodiment above and not further described here.

The distributed network system provided herein avoids unbalanced distribution of nodes in the network as a result of using the KAD algorithm to calculate the node ID through a Hash operation directly, and balances the distribution of nodes in the distributed network and the loads on the nodes. Moreover, because the valid length of the domain ID and the valid length of the peer ID are controlled, the node lists that need to be maintained by the node that joins the network are reduced drastically, the messages forwarded at the time of node query are reduced, and the system overhead is reduced.

Persons of ordinary skill in the art should understand that all or part of the steps of the method under the present invention may be implemented by a program instructing relevant hardware. The program may be stored in a computer readable storage medium. When the program runs, the steps of the method specified in any of the embodiments above can be performed. The storage medium may be a magnetic disk, a compact disk-read only memory (CD-ROM), a read only memory (ROM), or a random access memory (RAM).

Finally, it should be noted that the above embodiments are merely provided for describing the technical solution of the present invention, but not intended to limit the present invention. It is apparent that persons skilled in the art can make various modifications and variations to the invention without departing from the spirit and scope of the invention. The present invention is intended to cover the modifications and variations provided that they fall within the scope of protection defined by the following claims or their equivalents.

What is claimed is:

1. A distributed network construction method, comprising:
determining, according to an address of a requesting node which requests to join a distributed network, a domain of the distributed network that covers the requesting node;
obtaining a domain identifier (ID) of the determined domain;
using a processor to generate peer ID of the requesting node according to a number of peers in the domain;
forming a node ID of the requesting node by concatenating the domain ID with the peer ID;
sending the node ID to the requesting node;
obtaining, by the requesting node, information about a neighboring node according to the obtained node ID to join the distributed network, network,
wherein obtaining the information by the requesting node comprises:
sending, by the requesting node, a query request to a known access node, requesting to query the requesting node;
receiving information about the neighboring node from the access node, wherein the information about the neighboring node comprises a node ID of the neighboring node, and wherein the neighboring node is selected based at least in part on an exclusive-or (XOR) distance between the node ID of the neighboring node and the node ID of the requesting node;
comparing bits in the node ID of the neighboring node with bits in the node ID of the requesting node to determine a number of matched bits;
recording the information about the neighboring node into a corresponding node list of the requesting node according to the number of matched bits; and
using the neighboring node as an access node for sending a request for querying the requesting node to find information about a neighboring node whose node ID has a greatest number of matching bits to the node ID of the requesting node until all neighboring nodes received by the requesting node are the access node, and wherein the query is ended and the requesting node joins the distributed network.

2. The distributed network construction method according to claim 1, wherein obtaining the domain ID comprises:
setting M as a valid length of the domain ID, wherein M is a positive integer;
converting the number of domains existent in the distributed network into an M-bit value; and
generating the domain ID of the domain according to the M-bit value.

3. The distributed network construction method according to claim 1, wherein using a processor to generate the peer ID of the requesting node according to the number of peers in the domain comprises:
setting N as a valid length of the peer ID, wherein N is a positive integer; and
judging whether a free peer ID exists;
assigning the free peer ID to the requesting node if the free peer ID exists; and
if no free peer ID exists, obtaining the number of peers in the domain, converting the number into a corresponding N-bit value, and generating the peer ID of the requesting node according to the N-bit value.

4. The distributed network construction method according to claim 1, further comprising:

receiving a request for processing a withdrawn node from one or more nodes in the distributed network when the one or more nodes in the distributed network receive no response message from the withdrawn node;

checking a disabled node list; and judging whether the withdrawn node is disabled.

5. The distributed network construction method according to claim 1, further comprising:

searching, by a content query node, its node list for a node whose node ID is closest to a t-he-content ID of content being queried, using the found node as a first query node, and sending a query request as regards the content ID to the first query node when the content query requesting node in the distributed network initiates a query about content index information inclusive of the content ID;

returning, by the first query node, information about the first query node to the content query requesting node if the node list of the first query node comprises no node whose node ID is closer to the content ID than the node ID of the first query node;

returning, by a second query node, information about the second query node to the content query requesting node if the node list of the first query node comprises the second query node whose node ID is closer to the content ID than the node ID of the first query node;

sending, by the content query requesting node, a request for querying the content ID to the node corresponding to the returned node information;

returning, by the node corresponding to the returned node information, the content index information to the content query requesting node if the content index information is managed on this node or going on to search for the node whose node ID is closest to the content ID on this node to find the content index information if no content index information is managed on this node.

6. The distributed network construction method according to claim 1, further comprising:

receiving, by a first node, a task processing request such as a request for uploading, adding or deleting content;

judging whether resource performance of the first node meets task processing requirements;

if resource performance of the first node meets task processing requirements, returning node information of the first node to a second node that sends the task processing request, wherein the second node initiates operations to the first node; and if resource performance of the first node does not meet task processing requirements, selecting a third node whose resource performance meets the task processing requirements in node lists of the first node, wherein the selection begins with a node list which stores peer information of a domain of the first node and returning node information of the third node to the second node that sends the task processing request, and wherein the second node initiates operations to the third node.

7. The distributed network construction method according to claim 4, wherein checking a disabled node list and judging whether the withdrawn node is disabled comprises:

if the disabled node list comprises no information about the withdrawn node, creating the withdrawn node in the disabled node list and judging whether the withdrawn node is disabled, wherein if the withdrawn node is judged to be disabled, writing the node ID of the withdrawn node into a FreePeerID_List of a domain that covers the withdrawn node; or if the disabled node list comprises the information about the withdrawn node and no judgment has been made about whether the withdrawn node is disabled, judging whether the withdrawn node is disabled, wherein if the withdrawn node is judged to be disabled, writing the node ID of the withdrawn node into the FreePeerID List of the domain that covers the withdrawn node.

8. The distributed network construction method according to claim 4, further comprising:

scanning the disabled node list periodically; and deleting information about expired nodes in the disabled node list.

9. The distributed network construction method according to claim 5, wherein finding the second query node whose node ID is closer to the content ID than the node ID of the first query node in the node list of the first query node comprises:

searching the node list of the first query node for a list of neighboring nodes identified by M bits closest to M bits of a prefix of the content ID; and searching the list of neighboring nodes for a neighboring node whose node ID is closest to N bits of the prefix after the M bits of the content ID, wherein the found neighboring node is the second query node.

10. The distributed network construction method according to claim 5, further comprising:

finding, by a first node, all nodes in a second domain whose domain ID is closest to the domain ID of a first domain if the first domain comprises only the first node after the first node joins the first domain of the distributed network;

obtaining the content index information recorded in all nodes in the second domain, wherein the value of the M bits of the prefix of the content ID corresponding to such content index information is greater than or equal to the domain ID of the first domain;

finding a second node whose node ID is closest to the node ID of the first node if the first domain comprises other nodes; and obtaining the content index information recorded in the second node, wherein the value of the N bits of the prefix after the M bits of the content ID corresponding to such content index information is greater than or equal to the peer ID of the first node.

11. A non-transitory storage medium comprising:

a computer program stored in the non-transitory storage medium that comprises at least one code segment for processing signals, wherein the at least one code segment is executed by a machine so that the machine performs the following steps:

determining according to an address of a requesting node which requests to join a distributed network a domain of the distributed network that covers the requesting node;

obtaining a domain identifier (ID) of the determined domain;

generating a peer ID of the requesting node according to a number of peers in the domain;

concatenating the domain ID with the peer ID to form a node ID of the requesting node;

sending the node ID to the requesting node;

obtaining, by the requesting node, information about a neighboring node according to the obtained node ID to join the distributed network, wherein obtaining the information by the requesting node comprises:

sending, by the requesting node, a query request to a known access node, requesting to query the requesting node;

receiving information about the neighboring node from the access node, wherein the information about the neighboring node comprises a node ID of the neighboring node, and wherein the neighboring node is selected based at least in part on an exclusive-or (XOR) distance between the node ID of the neighboring node and the node ID of the requesting node;

comparing bits in the node ID of the neighboring node with bits in the node ID of the requesting node to determine a number of matched bits;

recording the information about the neighboring node into a corresponding node list of the requesting node according to the number of matched bits; and using the neighboring node as an access node for sending a request for querying the requesting node to find information about a neighboring node whose node ID has a greatest number of matching bits to the node ID of the requesting node until all neighboring nodes received by the requesting node are the access node, and wherein the query is ended and the requesting node joins the distributed network.

* * * * *

UNITED STATES PATENT AND TRADEMARK OFFICE
CERTIFICATE OF CORRECTION

| | | |
|---|---|---|
| PATENT NO. | : 8,489,726 B2 | Page 1 of 1 |
| APPLICATION NO. | : 12/980900 | |
| DATED | : July 16, 2013 | |
| INVENTOR(S) | : Tieying Wang | |

It is certified that error appears in the above-identified patent and that said Letters Patent is hereby corrected as shown below:

Title Page Section (74) should read as follows:

(74) Attorney, Agency, or Firm – Conley Rose P.C.; Grant Rodolph; Nicholas K. Beaulieu In the Claims Column 25 lines 7-35 – Claim 5 should read as follows:

5. The distributed network construction method according to claim 1, further comprising:
  searching, by a content query node, its node list for a node whose node ID is closest to a content ID of content being queried, using the found node as a first query node, and sending a query request as regards the content ID to the first query node when the content query requesting node in the distributed network initiates a query about content index information inclusive of the content ID;
 returning, by the first query node, information about the first query node to the content query requesting node if the node list of the first query node comprises no node whose node ID is closer to the content ID than the node ID of the first query node;
 returning, by a second query node, information about the second query node to the content query requesting node if the node list of the first query node comprises the second query node whose node ID is closer to the content ID than the node ID of the first query node;
 sending, by the content query requesting node, a request for querying the content ID to the node corresponding to the returned node information;
  returning, by the node corresponding to the returned node information, the content index information to the content query requesting node if the content index information is managed on this node or going on to search for the node whose node ID is closest to the content ID on this node to find the content index information if no content index information is managed on this node.

Signed and Sealed this
Third Day of September, 2013

Teresa Stanek Rea
*Acting Director of the United States Patent and Trademark Office*